(12) United States Patent
Lyons et al.

(10) Patent No.: US 10,769,159 B2
(45) Date of Patent: Sep. 8, 2020

(54) SYSTEMS AND METHODS FOR DATA MINING OF HISTORIC ELECTRONIC COMMUNICATION EXCHANGES TO IDENTIFY RELATIONSHIPS, PATTERNS, AND CORRELATIONS TO DEAL OUTCOMES

(71) Applicant: AON GLOBAL OPERATIONS PLC, SINGAPORE BRANCH, Singapore (SG)

(72) Inventors: Oisin Lyons, Mountjoy (IE); Barry Sheridan, Mountjoy (IE); Eoin Hurrell, Dublin (IE)

(73) Assignee: AON GLOBAL OPERATIONS PLC, SINGAPORE BRANCH, Singapore (SG)

( * ) Notice: Subject to any disclaimer, the term of this patent is extended or adjusted under 35 U.S.C. 154(b) by 265 days.

(21) Appl. No.: 15/850,410

(22) Filed: Dec. 21, 2017

(65) Prior Publication Data
US 2018/0181626 A1    Jun. 28, 2018

Related U.S. Application Data

(60) Provisional application No. 62/438,015, filed on Dec. 22, 2016, provisional application No. 62/438,340, filed on Dec. 22, 2016.

(51) Int. Cl.
*G06Q 10/00* (2012.01)
*G06Q 10/06* (2012.01)
(Continued)

(52) U.S. Cl.
CPC ........ *G06F 16/2465* (2019.01); *G06F 16/116* (2019.01); *G06F 16/254* (2019.01);
(Continued)

(58) Field of Classification Search
None
See application file for complete search history.

(56) References Cited

U.S. PATENT DOCUMENTS 7,461,044 B2 * 12/2008 Salahshour ............. G06F 9/542
                                                        382/224
7,962,903 B1 *  6/2011 Ross ................... G06F 9/45516
                                                        715/751
(Continued)

FOREIGN PATENT DOCUMENTS

CN    102591992 A    7/2012
CN    103514191 A    1/2014
(Continued)

OTHER PUBLICATIONS

International Search Report and Written Opinion issued in PCT Application No. PCT/SG2017/050644 dated Mar. 8, 2018.
(Continued)

*Primary Examiner* — Cheyne D Ly
(74) *Attorney, Agent, or Firm* — Gardella Grace P.A.

(57) ABSTRACT

In an illustrative embodiment, systems and methods for generating data metrics and relationship analysis from an organization's electronic communications archives include pre-processing the electronic communications into a consistent, workable format, including filtering the data to remove irrelevant messages. Machine learning models may be applied to support automatic identification of relevant message content for data analytics. The systems and methods may link the electronic communications with transaction records of a transactional platform and analyze the communications traffic in view of transactional patterns and outcomes. Communications between parties may be analyzed to identify timings and patterns, plus correlations between electronic communication patterns and business outcomes.

18 Claims, 16 Drawing Sheets

(51) Int. Cl.

| | | |
|---|---|---|
| *G06F 16/2458* | (2019.01) | |
| *G06Q 30/02* | (2012.01) | |
| *G06N 20/00* | (2019.01) | |
| *G06F 16/11* | (2019.01) | |
| *G06F 16/25* | (2019.01) | |
| *G06F 16/28* | (2019.01) | |

(52) U.S. Cl.
CPC ........... *G06F 16/288* (2019.01); *G06N 20/00* (2019.01); *G06Q 10/00* (2013.01); *G06Q 10/067* (2013.01); *G06Q 30/02* (2013.01); *G06Q 30/0201* (2013.01); *G06F 2216/03* (2013.01)

(56) References Cited

U.S. PATENT DOCUMENTS

| | | |
|---|---|---|
| 9,317,574 B1 | 4/2016 | Brisebois et al. |
| 9,390,240 B1 | 7/2016 | Brisebois et al. |
| 2006/0010217 A1* | 1/2006 | Sood ................. H04L 51/12 709/206 |
| 2006/0184485 A1* | 8/2006 | Horvitz ............. G06N 20/00 706/45 |
| 2008/0243675 A1* | 10/2008 | Parsons ............. G06Q 40/06 705/37 |
| 2009/0204569 A1 | 8/2009 | Bowden et al. |
| 2012/0239650 A1* | 9/2012 | Kim .................. G06F 16/355 707/737 |
| 2013/0339337 A1 | 12/2013 | Alkhateeb et al. |
| 2014/0304829 A1* | 10/2014 | Oliver ................ H04L 51/12 726/26 |
| 2016/0132800 A1 | 5/2016 | Davar et al. |
| 2018/0181625 A1 | 6/2018 | Lyons et al. |

FOREIGN PATENT DOCUMENTS

| | | |
|---|---|---|
| CN | 105488697 A | 4/2016 |
| WO | 2007034179 | 3/2007 |
| WO | 2013109524 | 7/2013 |

OTHER PUBLICATIONS

International Preliminary Report on Patentability issued in PCT Application No. PCT/SG2017/050644 dated Jun. 25, 2019.
Examination Report issued in European Application No. 17836071.5 dated Jun. 25, 2020.
Office Action issued in Chinese Patent Application No. 201780085272.8 dated Jun. 22, 2020.

* cited by examiner

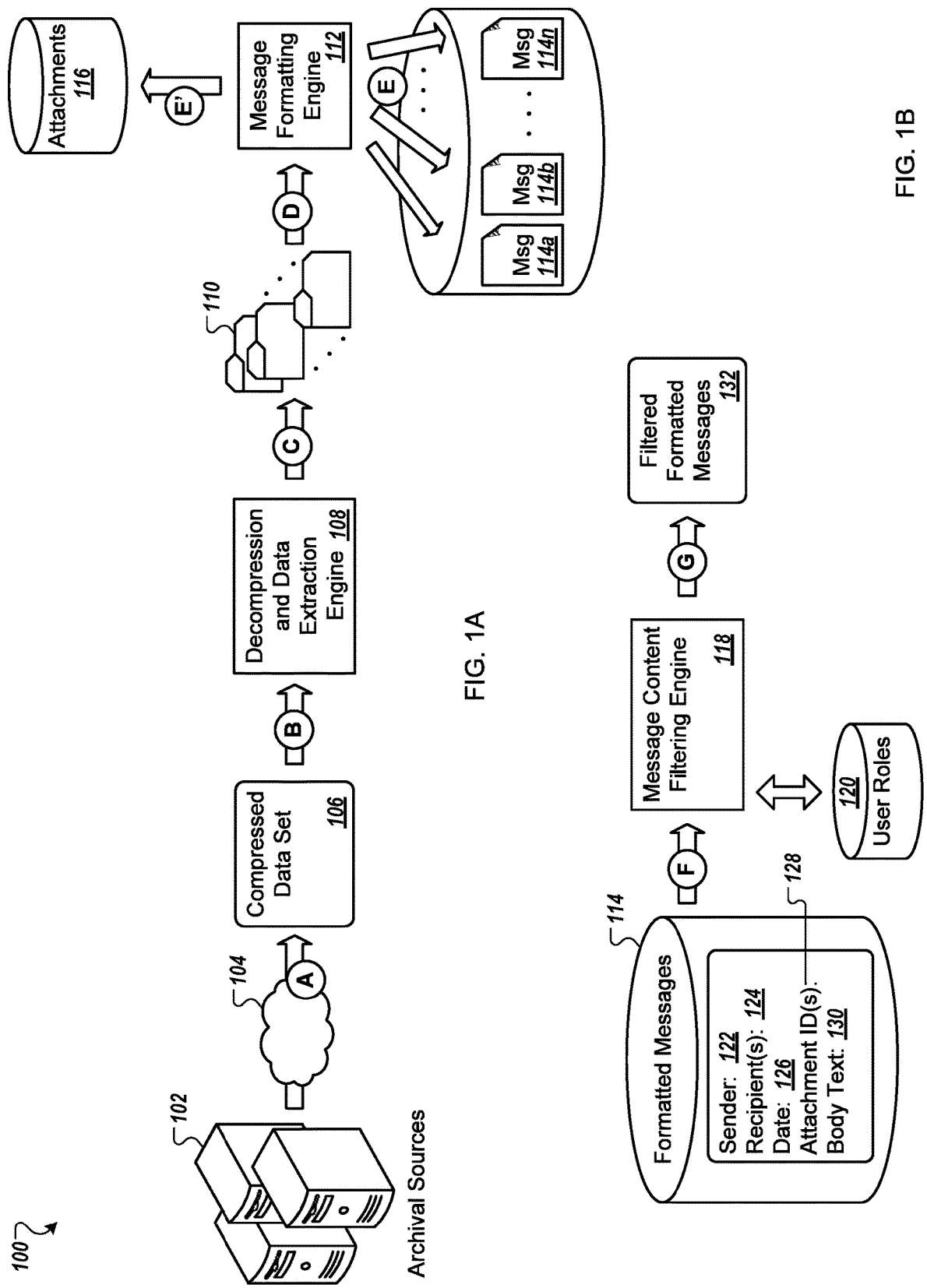

Broker Network Graph Scores

| Metrics | Values | Trend |
|---|---|---|
| Broker Node Health ⟵702 | 68 - Medium | |
| Conversation Count ⟵704 | 28 | |
| Connection Score (Node Degree) ⟵706 | 66 | |
| Flow Percentile ⟵708 | 71 - Medium | |
| Shared Carrier Node with other broker ⟵710 | 3 | |
| Average Email Sentiment to Carrier ⟵712 | 0.64 (Positive polarity) | |
| Average Email Sentiment from Carrier ⟵714 | 0.44 (Positive polarity) | |
| Email Sentiment from Carrier (positive/neutral/hostile) ⟵716 | | |
| Email Sentiment from Broker (positive/neutral/hostile) ⟵718 | | |
| Carrier Connection Coverage ⟵720 | 18/81 (22%) - 92 percentile | |
| Bound opportunities for 2015 (by 'Trade Creator') ⟵722 | $280M | |
| Total input trades to GRIP for 2015 (by 'Trade Creator') ⟵724 | 134 | |
| Percentage renewals in GRIP for 2015 (by 'Trade Creator') ⟵726 | 10% | |

FIG. 7

SYSTEMS AND METHODS FOR DATA MINING OF HISTORIC ELECTRONIC COMMUNICATION EXCHANGES TO IDENTIFY RELATIONSHIPS, PATTERNS, AND CORRELATIONS TO DEAL OUTCOMES

RELATED APPLICATIONS

This application claims priority to U.S. Provisional Patent Application Ser. No. 62/438,015 entitled "Systems and Methods for Identifying and Reducing Redundant Electronic Communications Data and Filtering Electronic Communications Data for Analysis" and filed Dec. 22, 2016; and to U.S. Provisional Patent Application Ser. No. 62/438,340 entitled "Systems and Methods for Data Mining of Historic Electronic Communication Exchanges to Identify Relationships, Patterns, and Correlations to Deal Outcomes" and filed Dec. 22, 2016. The present application is related to U.S. Provisional Patent Application No. 62/437,989 entitled "Systems and Methods for Intelligent Prospect Identification using Online Resources and Neural Network Processing to Classify Organizations based on Published Materials" and filed Dec. 22, 2016. All above identified applications are hereby incorporated by reference in their entireties.

BACKGROUND

The overall objective of the present disclosure is to enhance and automate several aspects of client prospect identification, discovery, and analysis using a combination of machine learning, natural language processing, mathematical modeling, and relational database modeling. By doing so, prospect results are provided more efficiently and at a higher quality. Prospect identification, for example, may aid in accurately generating prospects that fit a broker's interest in insurance products and industries (i.e., the broker's "appetite"). Brokers typically have a current list of clients that defines the broker's appetite. Brokers typically want to find other similar companies to the existing clients.

When prospecting, a broker typically strives to identify other similar brokers who may operate in a target area or who may be connected to a target prospect in some capacity. Due to the scale of large brokerage companies, it is impossible for a broker to have all this information at hand. However, by leveraging electronic communications data, one can build a profile of connections between brokers, insurance companies, and clients, via brokers' email interactions.

Electronic communications, such as emails, text messages, and intra-application messaging tools (e.g., Facebook messenger) allow individuals to collaborate, negotiate, and debate issues while creating a virtual "audit trail" of discourse. Businesses worldwide depend more and more upon these methods of communications, both inside an organization and when communicating with customers, clients, and other external collaborators.

Relationship maintenance, anticipation of needs of business partners (e.g., customer, client, joint venturer, project collaborator, fellow board member, other inter-office client-like relationships), and effective communications are essential for businesses to thrive. While some cycles are well-known (e.g., consumer purchase cycles and the holidays, etc.), cycles of business needs of particular business partners or within particular business partner demographic classifications (e.g., geographies, sectors, industries, etc.) may be more subtle.

The inventors recognized an untapped advantage in using historic electronic communications to develop insights into relationships, patterns or cycles of business partner needs, and correlations between customer/client communications and deal (e.g., negotiation, client retention, etc.) outcomes. In an illustrative example, a company with 7000 brokers, each sending or receiving 100 emails per day, will generate over 250 million emails per year. Due to the scale of large brokerage companies, by leveraging email data, one can build a profile of connections between brokers, insurance companies, and clients, via brokers' email interactions. By developing tools to analyze this email data, new discoveries can be made, including identifying key relationships and under-reported marketing behavior.

SUMMARY OF ILLUSTRATIVE EMBODIMENTS

In one aspect, to generate useful data metrics and relationship analysis from a companies' electronic communications archives, the data can first be retrieved and pre-processed into a consistent, workable format, including cleaning the data and filtering the data. Due to the voluminous size of the archived data, the inventors have created efficient and streamlined preprocessing solutions described in greater detail below. In some implementations, preprocessing includes reformatting electronic communications into a consistent format. Attachments to messages, in some embodiments, may be stored separately from the message bodies. For example, attachments may be analyzed to remove redundant files, saving storage space. In some implementations, pre-processing includes filtering electronic communications to remove messages having no business-related content. For example, the electronic communications may be filtered to remove messages to the human resource department or information technology department of the organization. In another example, the electronic communications may be filtered to remove messages involving a sender or recipient(s) identified with a personal email account (e.g., "gmail.com", "yahoo.com", etc.). In some implementations, pre-processing includes fingerprinting messages to identify frequency and count of communications between sets of parties. For example, historic communications between a broker and a particular client may be analyzed through fingerprinting messages by sender/recipient(s) sets.

In one aspect, to generate useful data metrics and relationship analysis from a companies' electronic communications archives, the data can be sorted to identify electronic communications relevant to desired analysis. In some implementations, a machine learning model is applied to review remaining electronic communications to identify information relevant to desired analysis. In one example, the machine learning model may be trained to identify message content related to business transactions. In some implementations, transactional information within the electronic communications may be linked with transaction records maintained in a transactional platform data store.

In one aspect, electronic communications are mined to determine a variety of useful data metrics and relationship analyses. In one example, data metrics and relationship analysis can include performing analysis of electronic communications related to transactions to identifying one or more of placement marketing data, transaction compliance data, and transactional timings and patterns data. The data may be derived, in part, through the linking of the electronic communications with the transaction records. In another example, data metrics and relationship analysis can include performing analysis of communications between parties to identify one or more of communications timings and patterns, correlations between electronic communications and business outcomes, and claims and exposure data. In a further example, electronic communications between identified parties can be analyzed over time to determine patterns, directions, and timings of communications between the parties.

The forgoing general description of the illustrative implementations and the following detailed description thereof are merely exemplary aspects of the teachings of this disclosure, and are not restrictive.

BRIEF DESCRIPTION OF THE DRAWINGS

A more complete appreciation of the innovations and many of the attendant advantages thereof will be readily obtained as the same becomes better understood by reference to the following detailed description when considered in connection with the accompanying drawings, where:

FIGS. 1A and 1B are block diagrams of example operational flows for preprocessing electronic communications data;

FIG. 7 is a table representing example broker network graph scores;

DETAILED DESCRIPTION OF ILLUSTRATIVE EMBODIMENTS

Figure 1C:
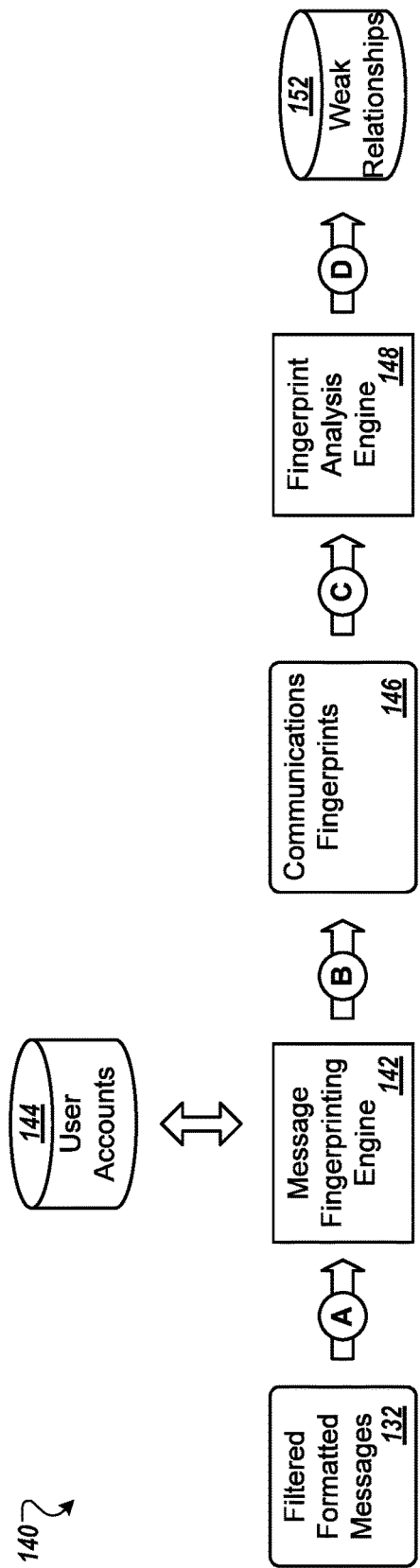
FIG. 1C is a block diagram of an example operational flow for determining relationships among electronic communications data.

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities.

Typically, a large company will store its electronic communications data archives online and offsite, either in its own archives or using a third-party service. One such email archiving service is provided by Proofpoint, Inc. of Sunnyvale, Calif. Such archives embody a wealth of information. FIGS. 1A to 1B present an operational flow 100 for transforming an electronic communications data archive into an organized data set for mining and analysis of corporate information.

Turning to FIG. 1A, in some implementations, archived electronic communications data 106 is retrieved via a network 104 from one or more archival sources 102 for preprocessing. The archival sources 102, in some examples, can include email application message archives (e.g., Outlook® by Microsoft of Redmond, Wash.), information submitted via corporate web site (e.g., through one or more information request forms), and/or information transmitted via a platform messaging tool. A platform messaging tool, for example, may include an information submission form, chat box, or other interface for users (e.g., brokers, clients, etc.) to engage in online discussion. To provide meaningful results, a lengthy timeframe of communications traffic is preferably reviewed. In some examples, the timeframe for historic electronic communications analysis may be at least three months, at least six months, at least one year, or eighteen months or more of electronic communications data. After initiating review using, for example, eighteen months of historic electronic communications data, additional communications traffic may be prepared for analysis using the methods and systems described herein on a periodic basis. The period for preparing additional archived electronic communications data, for example, may include a weekly, monthly, or bi-monthly, etc. data download and cleaning for purposes of electronic communications data analysis. The data analysis, in some examples, may be performed on a rolling basis (e.g., analyzing a moving window of time for relationships and transactional behaviors). The window for analysis may depend, in part, upon the type of work the organization performs. For an organization that typically performs brief projects (e.g., a number of days to a number of weeks), the window for analysis may be short (e.g., under six months). For organizations that conduct long-reaching transactions with business partners and clients, the window may be much larger (e.g., at least a year, up to three years, greater than three years, etc.).

The electronic communications data 106, as archived, is typically stored in a compressed format for storage (e.g., the "zip" format) and must be unpackaged. As illustrated in step B, a decompression and data extraction engine 108 may accept the compressed data set 106 and decompress the data to extract sets of messages.

The decompression and data extraction engine 108, in some implementations, is configured to identify and decompress data files compressed in a number of file formats such as, in some examples, ZIP format by Phil Katz, 7z by Igor Pavlov, and RAR by Eugene Roshal. The file format, for example, may depend upon the particular archival source and/or the particular message format (e.g., Windows-based messaging, Apple-based messaging, browser-based messaging, etc.).

In addition, the decompression and data extraction engine 108, in some implementations, is configured to extract individual messages from file types encompassing mailbox folders and/or entire mailboxes of electronic messages. The decompression and data extraction engine 108 may include translation sub-modules configured to extract messages, in some examples, from a mbox mailbox format, a Maildir format, or a MIX mailbox format. The MIX format, for example, has a mailbox storage architecture including a metadata file, an index file, a dynamic status data file, a threading/sorting cache file, and a number of message content files. Additionally, the MIX directory may include multiple sub-directories each having the same architectural structure of files. The decompression and data extraction engine 108 may utilize the MIX format to extract individual message content files. In formats including metadata files, for example containing information regarding destination addresses, attachments, and send instructions for a particular electronic communications message, the decompression and data extraction engine 108 may associate each extracted message with appropriate metadata information within a same electronic communications data file or folder.

As shown in FIG. 1A, the decompression and data extraction engine 108, at step C, may extract the decompressed electronic communications data into a set of folders 110, each folder containing a particular set of electronic communications data 106 (e.g., by user, by user and by day, by user and by formatting type, etc.). Each folder 110 may additionally contain one or more nested folders. Because the data will be much larger in its decompressed, extracted format, the compressed data set 106 may be processed by the decompression and data extraction engine 108 in portions (e.g., per compressed data file, per set of compressed data files not exceeding X megabytes or Y terabytes of information) while feeding the decompressed and extracted electronic communications data 110 to a message formatting engine 112, at step D, for formatting into a consistent file storage format usable in big data analytics.

To save storage space, upon decompressing and extracting the electronic communications data 106 into decompressed data sets (e.g., folders) 110 at step C, the decompression and data extraction engine 108 may delete the original compressed data set portion of the compressed data set 106.

At step E, in some implementations, the message formatting engine accepts the decompressed, extracted electronic communications data 110 and converts each message (e.g., each file, each set of electronics communications data, etc.) into a consistent format. To convert the electronic communications data 110, the message formatting engine 112, in some embodiments, parses each electronic communications message to extract useful information in a readily-analyzable format. In the case of proprietary email message formats, this step is especially relevant because information in proprietary email formats may contain extraneous information, may be difficult to read, and/or may not be human-readable. The message formatting engine 112 may include multiple parsing sub-modules, each sub-module configured to accept and convert messages of a particular proprietary format. In some examples, the message formatting engine 112 may include parsing sub-modules capable of translating electronic communications data formatted in .msg format (e.g., used by Microsoft Outlook® and Microsoft Exchange®), .eml format for electronic mail messages (e.g., multipurpose internet mail extensions (MIME) RFC 822 standard used by Microsoft Outlook®), and/or emlx format (e.g., Apple mail).

The parsing performed by the message formatting engine 112, in some implementations, extracts information including the email message sender, recipient(s), subject, body, etc., and saves the extracted information in a file 114a-n. The saved file is formatted to facilitate quick analysis. One such format is JavaScript Object Notation (JSON), which is an open-standard format that uses human-readable text, although any appropriate format may be used. JSON, similar to XML, allows for the definition of data and values through objects, strings, arrays, etc., that can be programmatically accessed to retrieve any desired data.

If an email message is discovered to also include one or more attachments, the message formatting engine, at step E' stores the attachment(s) 116 separately to ensure that further processing of the attachment would only occur if explicitly requested. In this manner, the scope of data analysis is confined and the overall storage capacity conserved. For example, a same attachment located in multiple emails may be preserved once within the attachments data store 116. Since electronic message attachments may account for approximately 70% of the entire electronic communications dataset size, deferring processing until needed and/or removing redundant copies can save a significant amount of time and resources.

To minimize storage requirements, the metadata associated with attachments and/or the size of the attachments may be analyzed to identify attachments which have been modified as opposed to resending the same attachment. Further, metadata and size may be analyzed to identify a same attachment attached to two or more communications under different attachment names. In a particular example, a file name of an attachment may be hashed and stored. Upon identifying another email with an attachment name matching the hash, a pointer to the same attachment may be included with the email. In further embodiments, the hash may consider features of the file contents (e.g., file size, etc.) such that the hash will be different if the same file name has been modified by the new sender. By tracking modification of files (e.g., tracing modification history) between multiple editing parties, both the attachment size may be reduced and activities between parties may be tracked accordingly.

The message formatting engine 112, in some implementations, uses pointers to link the stored electronic communications messages 114 to the related attachment(s) 116. The attachment pointer (e.g., an identifier such as a hexadecimal number) may be embedded in the parsed message file 114 itself. Although illustrated as being stored in separate storage devices, the attachments 116 may instead be stored within a same storage region (e.g., in a separate folders or other hierarchical storage structure).

The compressed data set 106 retrieved from archive 102, extracted and reformatted as discussed above, is stored as a formatted messages data set 114, 116 for further processing. Due to the large size of the archive and dataset (e.g., a year's worth of emails may include 7 TB of data), the next processing stages described in relation to FIGS. 1A and 1B may benefit substantially from the storage, memory, and processing power of cloud-computing services. One such provider of cloud-computing services is Amazon Web Services, Inc. of Seattle, Wash. ("AWS"), providing storage and computing tools and platforms (e.g., Amazon Simple Storage Service ("S3"), Amazon Elastic Compute Cloud ("EC2"), and Amazon Elastic MapReduce ("EMR")). Through the use of a cloud environment, additional resources may be allocated on demand during decompression, formatting, storage, and further processing of the electronic communications data set 106 by the decompression and data extraction engine 108 and the message formatting engine 112. Additionally, by distributing processing power to a multitude of servers, segments of the processing may be performed in parallel (e.g., multiple data sets may be retrieved, decompressed, and formatted simultaneously).

Turning to FIG. 1B, the electronic communications messages may be formatted to readily identify sender, recipient(s), date of transmission, pointers to any attachments, and the body text itself (e.g., the message). At step A, the formatted electronic communication messages 114 are provided to a message content filtering engine 118 to filter out any messages not eligible/desirable for data analytics processing. In other words, the electronic communications messages are filtered to remove messages having a low likelihood of producing valuable insights. An example process applied by the message content filtering engine, for example, is illustrated in a flow chart of FIG. 2.

Figure 2:
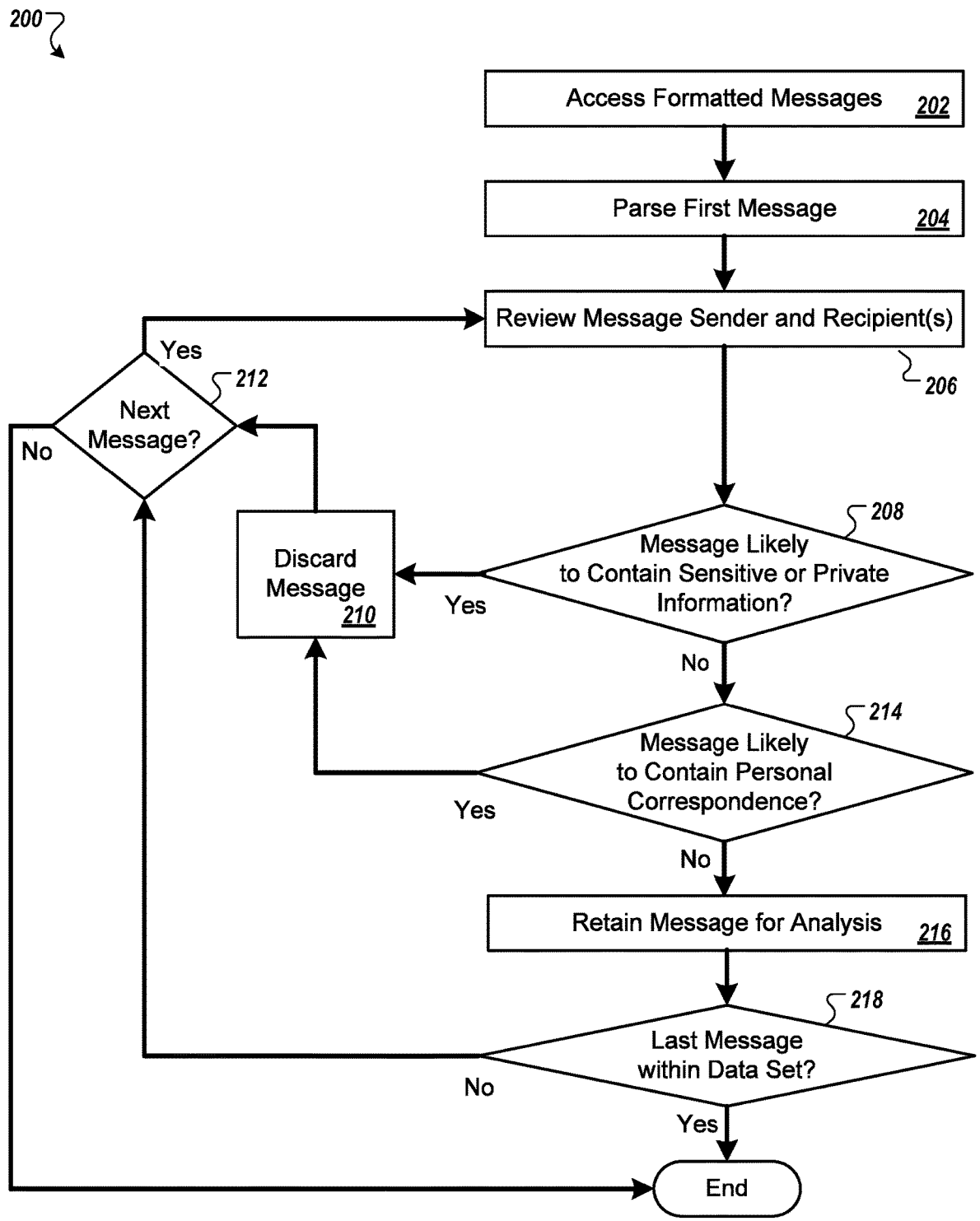
FIG. 2 is a flow chart of an example method for filtering electronic communications data for later analysis.

As illustrated in FIG. 2, a method for filtering electronic communications 200, in some implementations, begins with accessing a set of formatted messages (202). The message content filtering engine 118, for example, may access a portion of the formatted messages 114 from a data store or cloud storage region.

In some implementations, the first message is parsed (204) to recognize content regions and apply rules or filters to one or more of the content regions. The content regions, for example, may include the content regions of sender 122, recipient 124, date 126, attachment identifier(s) 128, and body text 130, as illustrated in FIG. 1B.

Initially, in some implementations, the message sender and recipient(s) are reviewed (206). For example, as illustrated in FIG. 1B, the message content filtering engine 118 accesses a user roles data store 120 to identify roles of the message sender 122 and recipient(s) 124. By identifying the internal roles of the individuals corresponding to the email addresses and/or user identifiers (e.g., in relation to chat boxes, etc.) of a sender 122 and recipient(s) 124 within each electronic communication, the message content filtering engine 118 can remove messages not related to business transactions. The irrelevant messages may involve, for example, support personnel such as information technology or human resources. For example, the message content filtering engine may discard messages sent to/from human resource representatives, since communications related to human resources are unlikely to be related to the broker-client relationships and, more importantly, often contain sensitive personal information that should be removed from the dataset.

In some implementations, if the message is likely to contain sensitive or private information (208), the message is discarded (210). In a further example, the message content filtering engine may discard messages sent to/from information technology (IT) representatives, since communications related to IT issues are unlikely to be related to client relationships. Upon discarded a message (210), the method 200 may continue with parsing any next message available (212).

In some implementations, the dataset is filtered to remove electronic communications messages containing personal content (214). Business transactional information may be easily separated from personal correspondence, in one example, by filtering out commercial free email accounts. Since transactional messages typically correspond to corporate email accounts (e.g., "name@client.com", any sender or recipient(s) having email addresses provided by webmail services such as Gmail.com, Hotmail.com, and Yahoo.com, may be discarded. By analyzing the sender and recipient(s) associated with each electronic communication, the message content filtering engine may filter messages which are personal in nature. Conversely, the message content filtering engine may be supplied with a list of client domains (e.g., "client.com", etc.) and filter any message not containing a sender or recipient having a client domain. If the message is deemed to be personal in content, in some implementations, the message is discarded (210) and the method 200 continues with any next message available for parsing (212).

In another example (not illustrated in FIG. 2), the message content filtering engine 118 may contain rules for filtering out messages communicated by trade organizations, vendors, or other non-client communications. These messages, for example, can be identified by their domain name as identified in the sender 122 or recipient(s) 124. Alternatively or additionally, vendor or trade organization communications may be identified through parsing (e.g., word or phrase matching, natural language processing, etc.) the body text 130.

In some implementations, upon completion of filtering, the message is retained for analysis (216). For example, the message may be stored to an interim storage region for further review. In another example, the message may be stored in a more permanent storage region (e.g., database) for access by a data analytics platform.

If the message is the last message in the data set (218), the method 200 ends. Otherwise, the method 200 continues to review messages (206).

In some implementations, the messages, after filtering, are analyzed to identify whether each message is between infrequent correspondents. For example, messages may be identified as having correspondents who communicate less than once per month, less than once per quarter, etc. Across the dataset, the frequency of communications between two parties may indicate the strength of their relationship. Thus, for example, if a broker and another party only have one email communication, it may be assumed that the relationship is not strong. For example, if two parties "A" and "B" are only found communicating with one another in two emails six months apart, these two emails may be identified as a low-frequency communication.

Turning to FIG. 1C, to identify frequency of communications, the filtered, formatted electronic communications messages may be provided to an operational flow 140 for analyzing relationship strength between corresponding parties. In some implementations, the operational flow 140 begins at step A with providing the filtered formatted message 132 generated by the message content filtering engine 118 to a message fingerprinting engine 142 for producing unique identifiers, such as electronic communication fingerprint hashes, for the purpose of aggregating and counting the occurrences of contacts between two individuals (e.g., as senders and recipients). Since parties may communicate over a variety of media (e.g., both email and transactional platform-based communication systems, via multiple email accounts, text messaging from a mobile account as well as email, etc.), the message fingerprinting engine 142 may access user account information 144 to match a particular user to the sender/recipient(s) field regardless of the particular account used for the particular electronic communications message. The user information may be appended to the sender 122/recipient(s) 124 information, for example.

In some implementations, the message fingerprinting engine 142 then counts total occurrences of communications between two parties to generate a communications fingerprint 146. In a particular example, the message fingerprinting engine 142 may accumulate data regarding recency and/or continuity of occurrences of communications between two parties (e.g., a count of occurrences per timeframe such as per week over the total time period analysed) to generate a communications fingerprint (e.g., hash table of communications events) representing the electronic communications relationship between the two parties. The message fingerprinting engine 142 outputs the communications fingerprints 146 at step B.

At step C, in some implementations, a fingerprint analysis engine 148 analyses each communication fingerprint for adequate frequency of communication. The fingerprint analysis engine may add the user pair (e.g., identifier of user accounts corresponding to the senders/recipients analysed) to a data store of weak relationships 152 if the two parties are determined to communicate infrequently. Infrequent communication, for example, may be triggered when the parties have communicated fewer than 10 times within the analyzed timeframe (e.g., 1 year, 18 months, etc.). In additional examples, infrequency may be established if the parties have not communicated over a dozen times within the analyzed timeframe, at least 20 times within the given timeframe, etc. In a particular example, infrequency may be linked to the analyzed timeframe (e.g., an average of once per month, an average of 1.5 times per month, etc.).

Figure 1D:
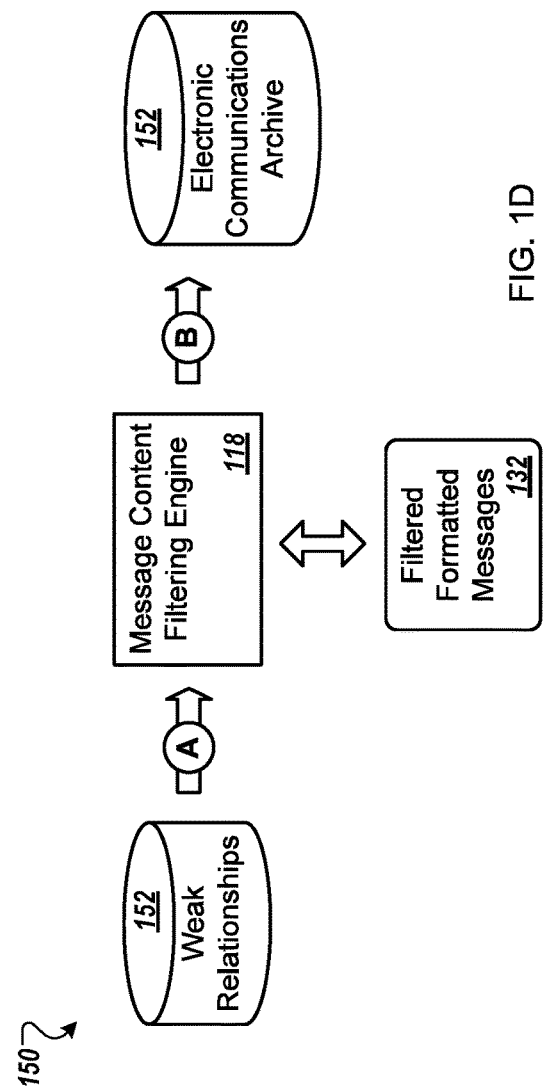
FIG. 1D is a block diagram of an operation flow for filtering a corpus of electronic messages based upon the relationships determined in FIG. 1C.

Turning to an operational flow 150 of FIG. 1D, the message content filtering engine 118 of FIG. 1B, in some implementations, then accesses the weak relationship data structure 152 to filter electronic communications between parties identified has having weak relationships. The outcome of the operational flow 150 is an electronic communications archive 154 for analytics operations.

In generating communication fingerprints, one method of performing the preprocessing is to run the associated functions over the entire dataset as described above. Alternatively, a snapshot of the dataset may be generated to enhance the preprocessing speed. For example, by using a linear probabilistic counter to scale to the dataset, unique messages, emails, domains, etc. can be counted at an acceptable error rate within a short amount of time (e.g., <1 min for 700 GB of data). Using a cardinality estimation algorithm, for example, common properties such as email count, attachment counts, unique sender counts, etc. may be rapidly estimated. In a particular example, scalable processing requirements may be determined based upon a brief scope of the common properties of the data set to be analysed. Using these estimations, further to the example, cloud computing resources may be allocated to perform a complete analysis of the archived message data.

Accordingly, through preprocessing of archived email data, large amounts of email data are cleaned, filtered, and formatted such that detailed analysis of their content can be performed.

In some implementations, the preprocessed electronic communications archive 152 with its associated document attachments 116 is stored on a server as a dataset, with the electronic communications messages uniformly formatted for analysis. Such available formats include JavaScript Object Notation (JSON) and Extensible Markup Language (XML), both of which are human-readable and machine-readable formats. The large size of the archive and dataset (e.g., a year's worth of emails may include up to 30 TB of data, for example) and the need to process and analyze the archive and dataset can benefit substantially from the storage, memory, and processing power of cloud-computing services. For example, multiple slave server nodes can be used to quickly process large datasets at the same time.

Prior to conducting analysis of the archived electronic communications messages 152, in some implementations, the set of messages may be additionally filtered to analyze only those including business-related message content. For example, many messages captured and cleaned may be personal in nature or otherwise lack business-related message content, such as messages agreeing on a time for a phone call. To more quickly and accurately capture business-related content, the archived electronic communication messages 152 may first be reviewed by a business content identifying operational flow 300 of FIG. 3A. In some implementations, the operational flow 300 begins with a ground truth identification engine 302 retrieving an initial subset of the archived electronic communications content 152 for analysis. The ground truth identification engine 302, in some embodiments, creates a base set of examples of both business-related content (positive examples) 304 and non-business-related content (negative examples) 306. The subset of messages, for example, may be fed into a data store and message broker for quick access and sequential presentation. The ground truth identification engine 302, for example, may present body text 130 to one or more users who create training sets of data by classifying each message content as either business-related or non-business related. The training data 304, 306, at step B, are stored in a ground truth data store 308 for machine learning analysis.

The ground truth data sets 304, 306, at step C, are analyzed by a ground truth analysis engine 310 to generate a machine learning model 312 for classifying electronic communications message content as business-related content or non-business-related content. The machine learning model 312, for example, includes a number of features that represent both positive matches (business content) and negative matches (non-business content). To identify the features representing the two electronic communications dataset classifications, the ground truth analysis engine 310 may apply term frequency-inverse document frequency ("tf-idf") techniques to isolate useful key terms from the body text. The tf-idf algorithm applies a weighting factor in textual data mining which increases proportionally to the number of times a term appears within a first document or collection of terms, but decreases by the frequency of the term as used in a more general corpus of textual data (e.g., the bulk of the positive examples and negative examples). This allows the ground truth analysis engine 310 to isolate key terms relevant to both business content and non-business content electronics communication message text.

Further, the ground truth analysis engine 310 may scrape data (e.g., textual information) from each attachment 116 associated with messages of the ground truth data set 304, 306 (e.g., according to attachment identifiers 128) to obtain further features representative of business data content and/or non-business data content. For example, the scraped attachment text may be analyzed using tf-idf algorithms. Because the attachments 116 are separate for the body content 130, the terms isolated from the attachments 116 may be kept separate from the terms isolated from body text 130 and/or weighted according to their attachment location (e.g., downplayed in comparison to terms identified within the body text 130). At step D, the features are collected in a machine learning model 312 for automated analysis and classification of the remaining cleaned messages dataset 152.

The machine learning model 312, in one example, may be generated using a probabilistic classifier for textual classification. The probabilistic classifier may consider features individually, assuming that the value of a particular feature is independent of the value of any other feature, simplifying the analysis.

The machine learning model 312, in another example, may be generated using a support vector machine (SVM) that uses a non-probabilistic binary linear classifier to classify each electronic communications messages as either business content-related or non-business content-related. The SVM, for example, may map inputs into a high-dimensional feature space, determining a feature match between each electronic communications message 152 and the training data set 304, 306.

Once the machine learning model 312 has been generated, in some implementations, the machine learning model 312 is vetted through additional classification review. For example, a portion of the communications data 152 in addition to the ground truth positive examples 304 and negative examples 306 may be reviewed and classified using the machine learning model 312, then presented for user review and manual classification as positive and negative results. The user review feedback may be fed into the machine learning model 312 to refine its performance. Although described as an extension of operational flow 300, in ongoing analysis where the machine learning model 312 has already been trained, the message classification engine 322 may be used to classify additional archived data sets on an ongoing (e.g., periodic) basis as described above.

Figure 3A:
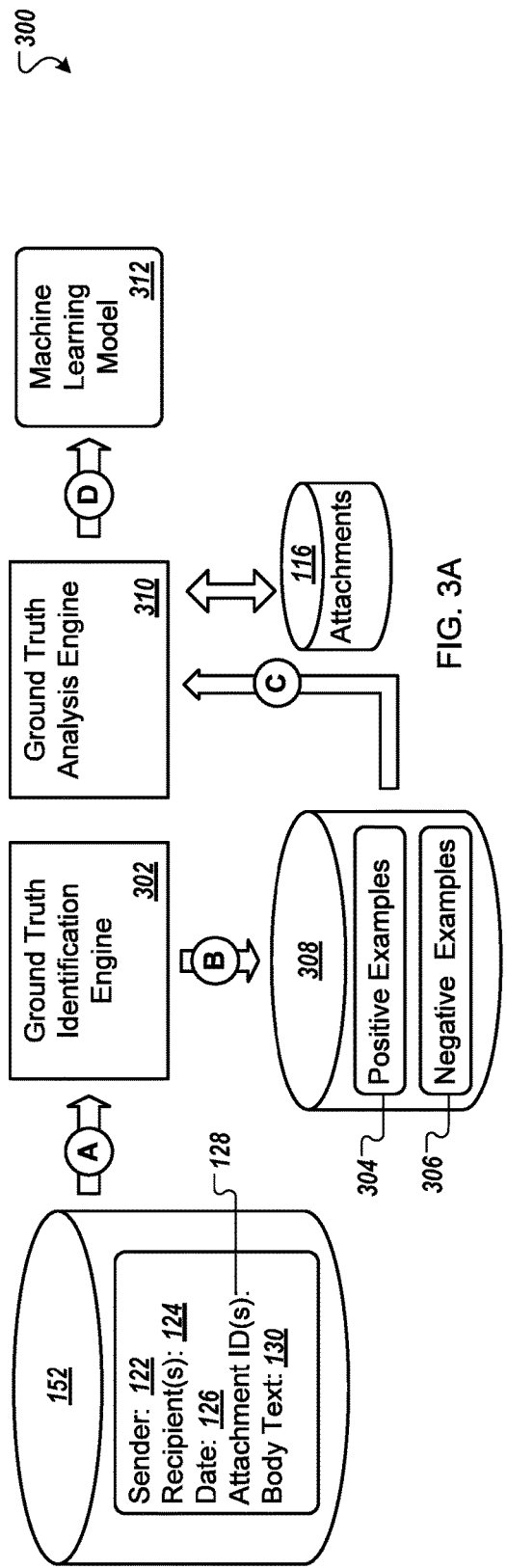
FIGS. 3A and 3B are block diagrams of example operational flows for generating and applying a machine learning model for automatically identifying electronic communications messages as containing business-related content.
Figure 3B:
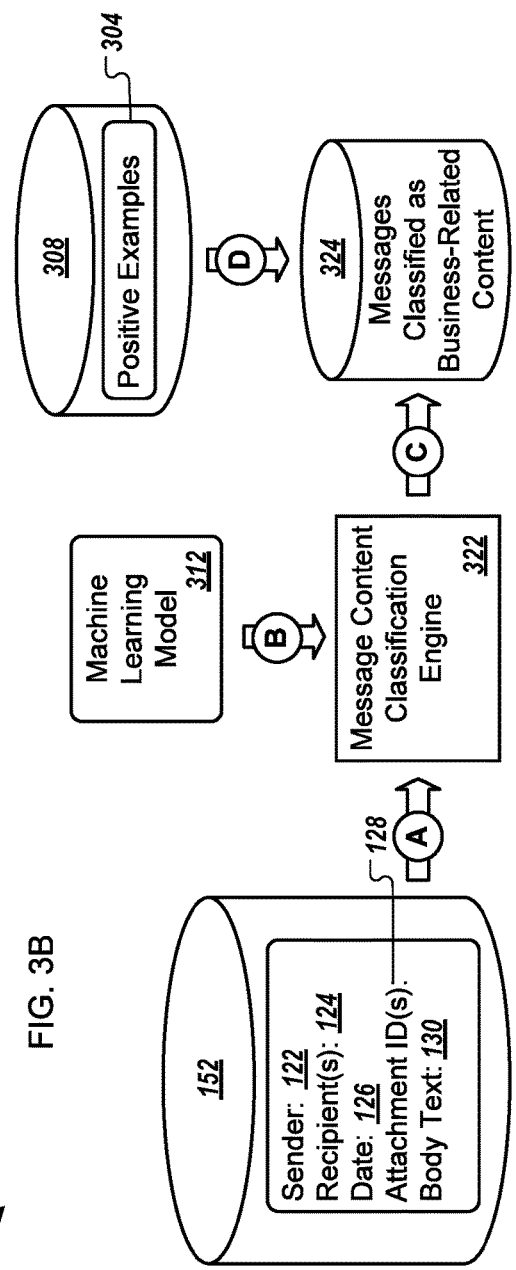

In some implementations, the remaining cleaned messages, at step A of FIG. 3B, are provided to a message classification operational flow 320, as illustrated in FIG. 3B, for classifying as business-related or non-business related.

The message content classification engine 322, in some implementations, applies the machine learning model 312 to the archived electronic message content 152 to generate, at step C, a final set of electronic communications messages classified as business-related content 324. If new ground truth 308 is available, at step D, the initially classified positive examples 304 from the ground truth data set 308 of FIG. 3A, may be added to the data set.

At this point, the business content message data set 324 can be used for data mining and analysis. Broadly, the business content message data set 324 can be mined and analyzed to produce both communications statistics and communications network visualizations. In an illustrative example, messages classified as business-related content 324 may be mined and analyzed according to the following desired traits: (1) broker communications with European based insurance carriers, (2) during Q1 of 4014, and (3) where over 300 emails were sent between the parties. Other targeted data review and analysis inquiries are possible. Example value-added analysis is described below in relation to FIGS. 4A-4C and FIG. 5.

The operational flows 300, 320 illustrated in FIGS. 3A and 3B may be recursive, where, prior to analyzing the corpus of the cleaned messages, a further subset of the cleaned messages are analyzed using the machine learning model 312 as explained in relation to FIG. 3B, and then the results of this analysis are presented to a user via the process described in FIG. 3A. The user, then, can confirm or reject each automated classification.

Figure 4A:
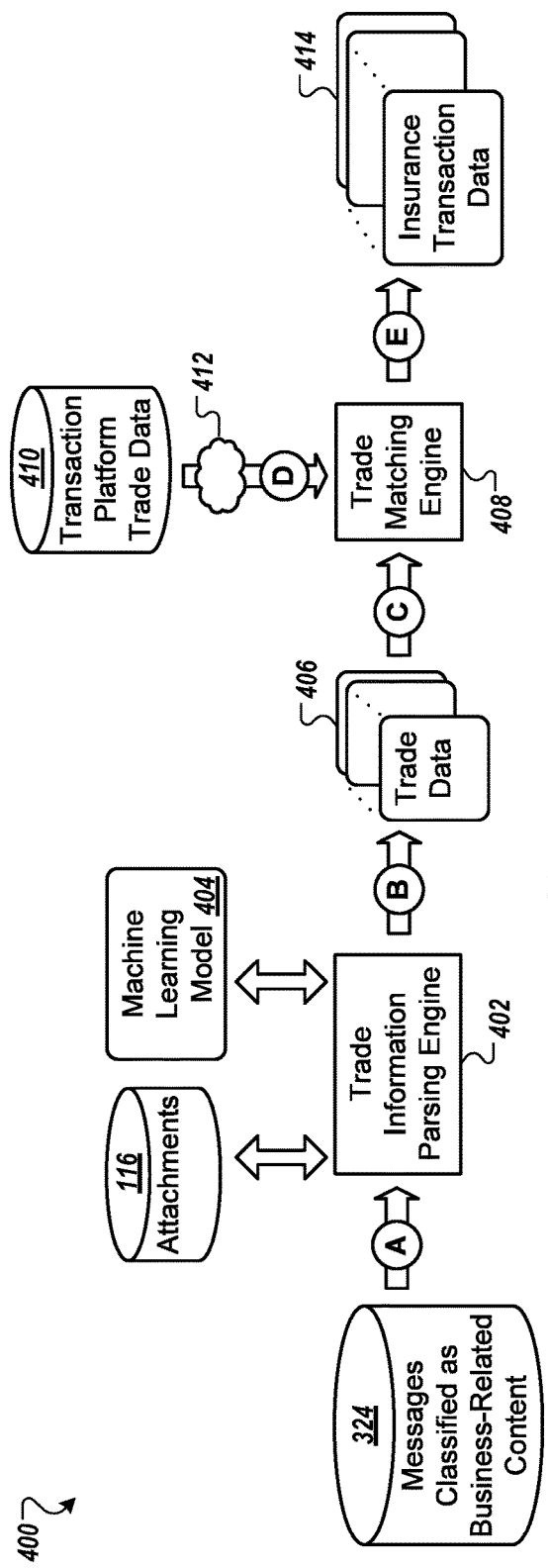
FIG. 4A is a block diagram of an example operational flow for extracting trade information from business-related electronic communications data and matching the trade information to transactional data maintained by an insurance exchange platform.

Turning to FIG. 4A, in some implementations, a transaction identifying operational flow 400 illustrates example steps for analyzing messages between senders and recipients in the business-related electronic message content 324 to match messages to transactions captured within transactional archives.

In some implementations, the messages containing business-related content 324, at step A, are provided to a trade information parsing engine 402 to parse out information regarding transaction negotiations, such as insurance transaction negotiations. The trade information parsing engine 402, for example, may produce a list of key terms from the content (e.g. body text 130 and optionally a header and/or attachment name(s)) of the business-related electronic communications related to trade information. In one example, the trade information parsing engine 402 filters the tf-idf output of the message content classification engine 322 to identify trade-related messages. The trade information parsing engine 402 may further using a machine learning model 404 to accurately classify whether each business-related content message 324 includes correspondence related to one or more transactions such as insurance trades. The machine learning model 404, for example, may be generated in a similar manner to the machine learning model 312 created in relation to FIG. 3A, but the classification would be tailored to identify terminology specifically related to insurance trades.

Further, the trade information parsing engine 402 may parse text data scraped from one or more attachments 116 shared between two parties. In a particular example, consider a spreadsheet attachment containing the sentence "This is the quote disclosure for CompanyA." The sentence may be broken down into a series of n-grams, including 4-gram "is", 5-gram "the for", 6-gram "this", 7-gram "quote", 8-gram "CompanyA", and 30-gram "disclosure". If the n-grams for different attachments 116 within a series of communications between two parties are substantially similar, then a positive match can be determined and duplicate attachments 116 can be ignored while parsing trade data 406 from the business-related electronic communications messages 324.

In another example, n-gram analysis may be applied to electronic signatures to match a signature typically found on policy/trade related electronic messages. A user may include varying signature blocks applicable to varying types of emails (e.g., internal, external, etc.). In some brokerage organizations, the signature may follow a 'generic formula' when the electronic communication contains policy/trade information. The formulaic signature can be identified using n-gram analysis as described above, quickly allowing the trade information parsing engine 402 to flag the particular electronic message 324 for further processing as potentially pertaining to valuable trade/policy related information.

The trade information parsing engine 324, at step B, produces a set of trade data 406. The trade data 406, for example, may include trade-related terminology and, optionally, sentence structure surrounding the same for later natural language analysis. The trade data 406 may further include timestamp information including the date 126 of the electronic communication 324 as well as, optionally, additional date information included within (e.g., spreadsheet entry(ies) in one or more attachments, etc.). Finally, the trade data 406 may include parties to the transaction which can either be the sender/receiver information 122, 124 or the sender 122 as well as one or more parties identified within the body text 130 (e.g., a client identified by a broker when corresponding with an insurance carrier). Each set of trade data 406 may correspond with a particular electronic communication message 324 or a series of electronic communications 324 between two parties to the transaction.

At step C, in some implementations, the trade data 406 is provided to a trade matching engine 408 which endeavors to match individual trade data sets 406 with trade data captured by a transactional platform (e.g., an insurance transaction platform such as the Global Risk Insights Platform provided by Aon Corporation). The parties, dates, and stages of transaction, for example, may be referenced within transactional platform trade data 410 (e.g., through a series of queries supplied by the trade matching engine 408 to an insurance platform data store via a network 412) at step D.

In another example, internal trade identifiers (e.g., trade identification numbers or strings) may be identified within the body text 130 or scraped attachment data. Using the trade identifiers, the trade matching engine 408 may access corresponding policy information via the transactional platform trade data 410. A given body text 130 or attachment 116 may reference one or many policies. The policy identifiers may be discovered, in part, through n-gram analysis based upon at least the length of policy identifiers.

The results of the queries may be interleaved by the trade matching engine 408 with the trade data 406 to generate, at step E, a set of transaction data 414 containing the trade data matches with transactional information corresponding to transactions captured by the transactional platform. This enhanced (more complete) trade information 414 may be used to conduct additional analysis and statistical generation.

Further, in some implementations, the trade data 406 captured within the business-related electronic communications messages 324 is used to fill any gaps in transactional information missing within the transactional platform trade data 410 (e.g., trade details not copied to the transactional platform data store 410 but captured within the electronic communications messages 324). For example, data may be logged within the transactional platform only in relation to the carrier which accepted the transaction, although the opportunity was in fact marketed to multiple additional carriers. Records regarding pursued transactional opportunities may be used to glean additional insights into effectiveness of broker relationships and transactional management.

Figure 4B:
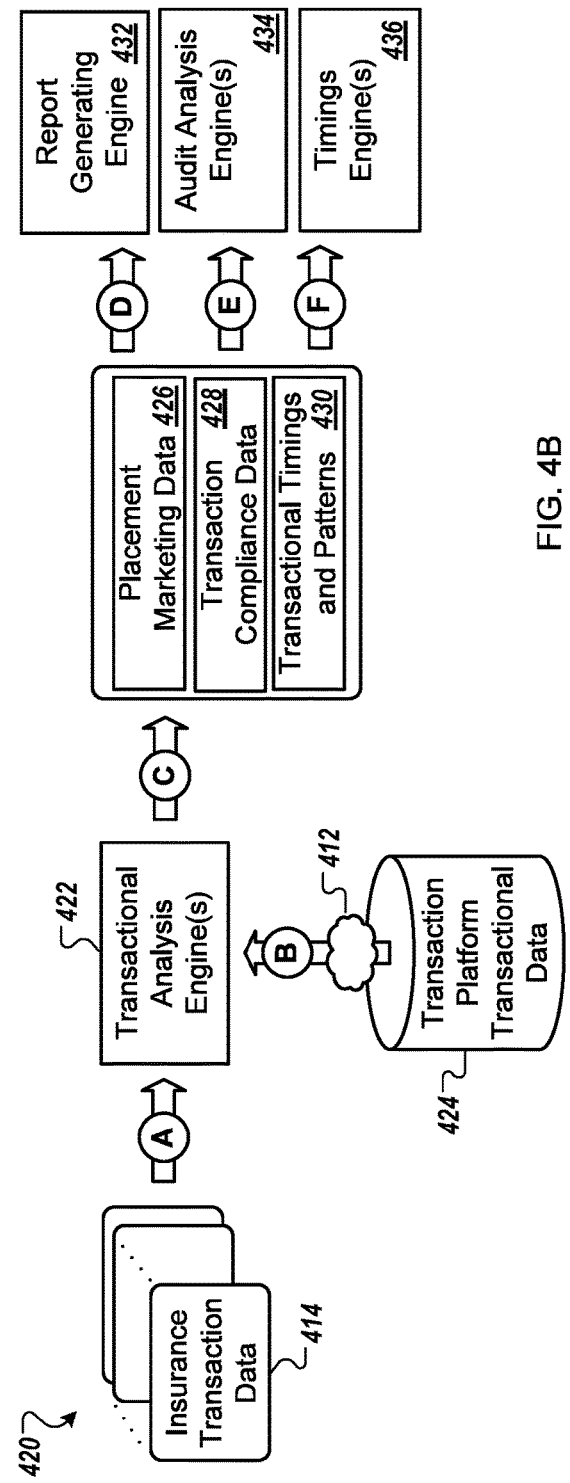
FIG. 4B is a block diagram of an example operational flow for analyzing and classifying transactional data derived from business-related electronic communications.

Turning to FIG. 4B, an operational flow 420 illustrates example steps for analyzing transaction data 414 to derive additional insights. The transaction data 414, for example, may be derived via the operational flow 400 of FIG. 4A.

In some implementations, the operational flow 420 begins with providing the insurance transaction data 414, at step A, to one or more transactional analysis engines 422 to produce data sets for statistical analysis and/or visualization generation. A portion of the transactional analysis engines 422 may access additional information 424 captured by the transactional platform, at step B, to enhance understanding of the business-related data content. The insurance platform transactional information 424, in some examples, may include policy data, document management data, and/or trade auditing data.

The transactional analysis engines 422, at step C, generate data related to the insurance transaction data such as, in some examples, placement marketing data 426, insurance transaction compliance data 428, and insurance transaction timings and patterns data 430.

In a first example, the placement marketing data 426 may determine various carriers who were contacted for quotes in comparison to the carrier selected. The transaction data 424, for example, may include sentence structure surrounding the trade-related communications (or, alternatively, be linked into the original trade-related electronic communications message body text 130 and/or scraped attachment text) to enable semantic analysis of the trade-related electronic communications message 324. The placement marketing data 426, for example, may be used by a report generating engine 432 to produce quote disclosure reports. Quote disclosure reports include, for example, information such as businesses and markets approached, quotes given, responses to quotes, commissions, fees, and income to be received.

The transactional analysis engine(s) 422, in some implementations, generate insurance transaction compliance data 428. The insurance transaction compliance data 428 may be provided to one or more audit analysis engine(s) 434 to confirm audit trail information in light of the transaction compliance data 428. For example, based upon holes in the audit trail of information related to completed historic transactions (e.g., bound, declined, etc.), the audit analysis engine(s) 434 may discover that the broker failed to log various transactional stages captured in the electronic messages. The audit analysis engine(s) 434 may further amend the audit trail information to fill the gaps as discovered within the electronic message content 324.

In a final example, in some implementations, the transactional analysis engine(s) 422 analyze transactional timings and patterns to determine common negotiation cycles, such as length between transactional stages, timing between initial contact and transaction completion, typical response delay between broker contact and client or carrier correspondence (or decision as captured within the insurance platform transactional data). These transactional timings and patterns 430 may be analyzed by a timings engine 436 to identify patterns and generate feedback (e.g., report information, graphs, etc.) demonstrating timings for review by participants in the transactional platform.

Figure 4C:
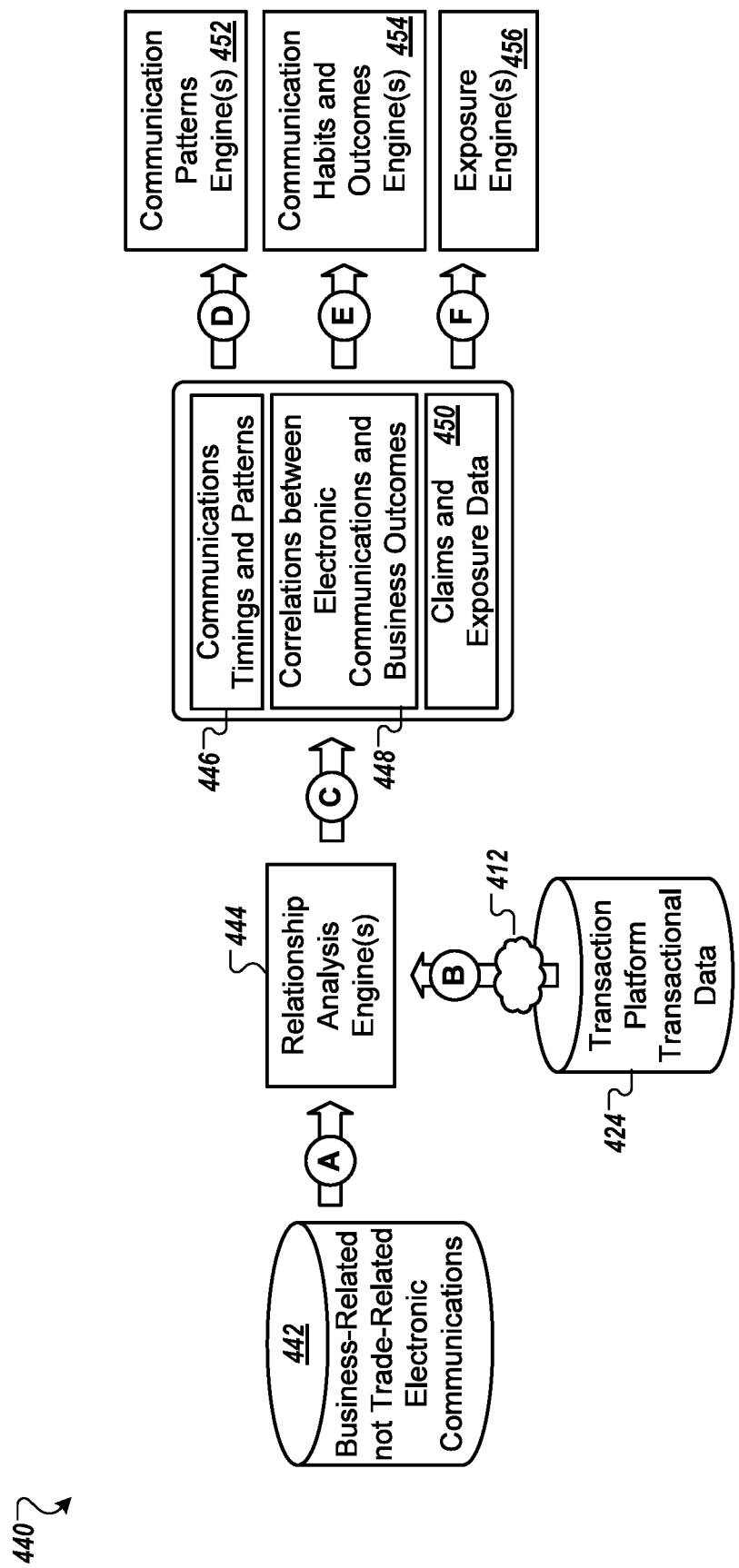
FIG. 4C is a block diagram of an example operational flow for analyzing relationships within business-related electronic communications data and correlating relationships to business outcomes.

In some implementations, the trade matching engine 408 of FIG. 4A flags electronic communications 324 having trade information, such that the electronic communications 324 not pertaining to trades may be separated into a set of business-related but not trade-related electronic communications 442, illustrated in FIG. 4C. Turning to FIG. 4C, business-related but not trade-related electronic communications 442 may also be analyzed to glean insights into general communications traffic and relationship building. As shown in step A, at least the messages dismissed in FIG. 4A as not containing trade-related content 442, in some implementations, are analyzed by one or more relationship analysis engines 444.

At step B, in some implementations, one or more of the relationship analysis engine(s) 444 access insurance platform transactional data 424 to combine with message analysis in determining valuable insights. The platform transactional data 424, in some examples, may include trade data, policy data, and/or claims data.

The relationship analysis engine(s) 444, in some embodiments, derive correlations between electronic communications 442 and business outcomes. For example, the relationship analysis engine(s) 444 may analyze electronic communications 442 between brokers and carriers over the course of a significant time period (e.g., 6 months, 9 months, 3 year, etc.) to discern frequency and/or cycles within the communications. By analyzing the frequency of carrier communications, the relationship analysis engine(s) 444 may discover, for example, time periods over the course of the year in which carrier communications are at a high or a low. A set of communications timings and patterns data 446, developed by the relationship analysis engine(s) 444, may be provided to a communication patterns engine 452 to generate reports and graphical insights relating to this data. This insight may inform brokers whether time is spent prudently over the course of the year (or during particular times during the year) in maintaining relations with insurance carriers.

Figure 6A:
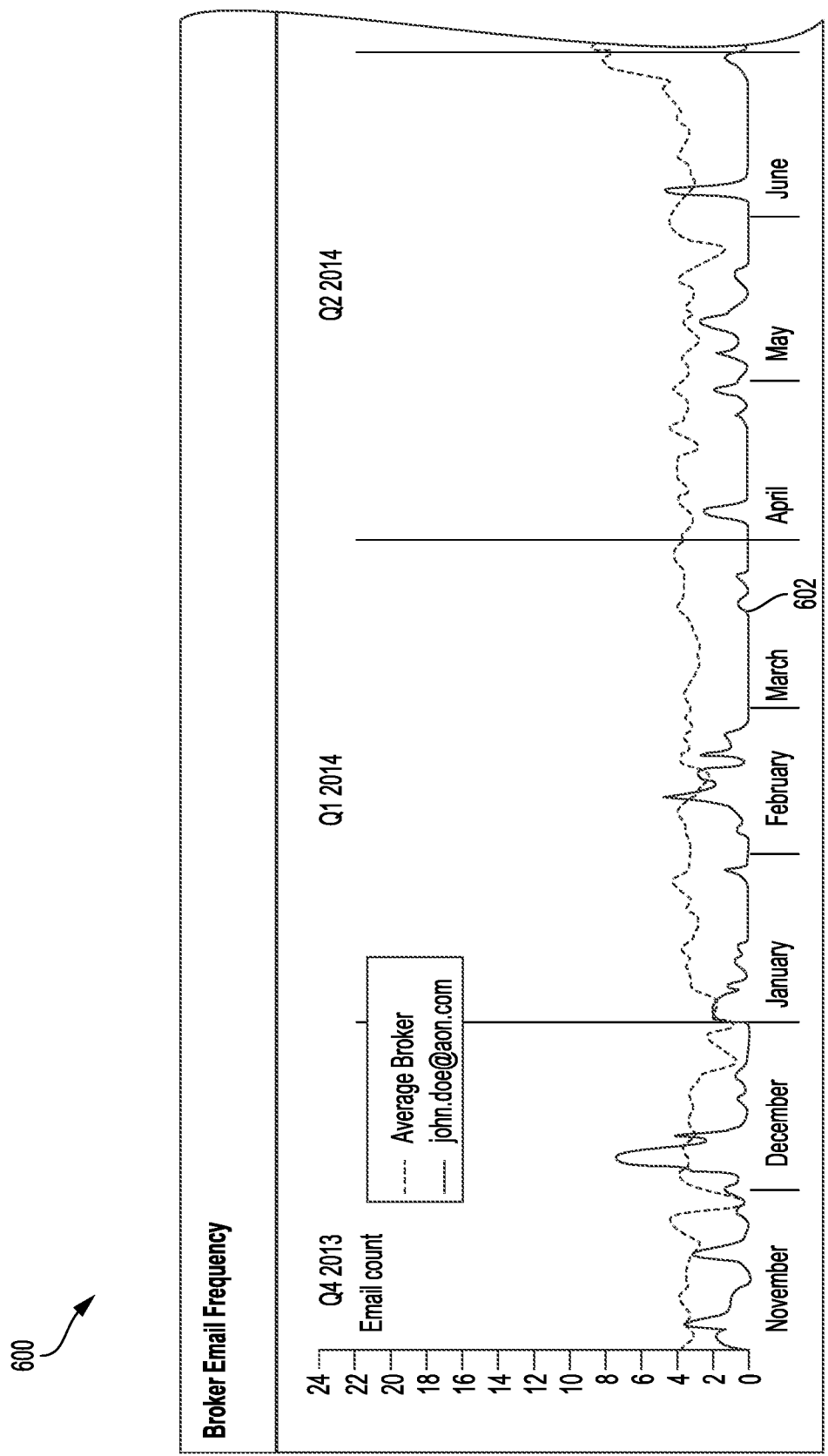
FIGS. 6A and 6B are screen shots of example user interfaces illustrating a graphical representation of electronic communication frequency.
Figure 6A:
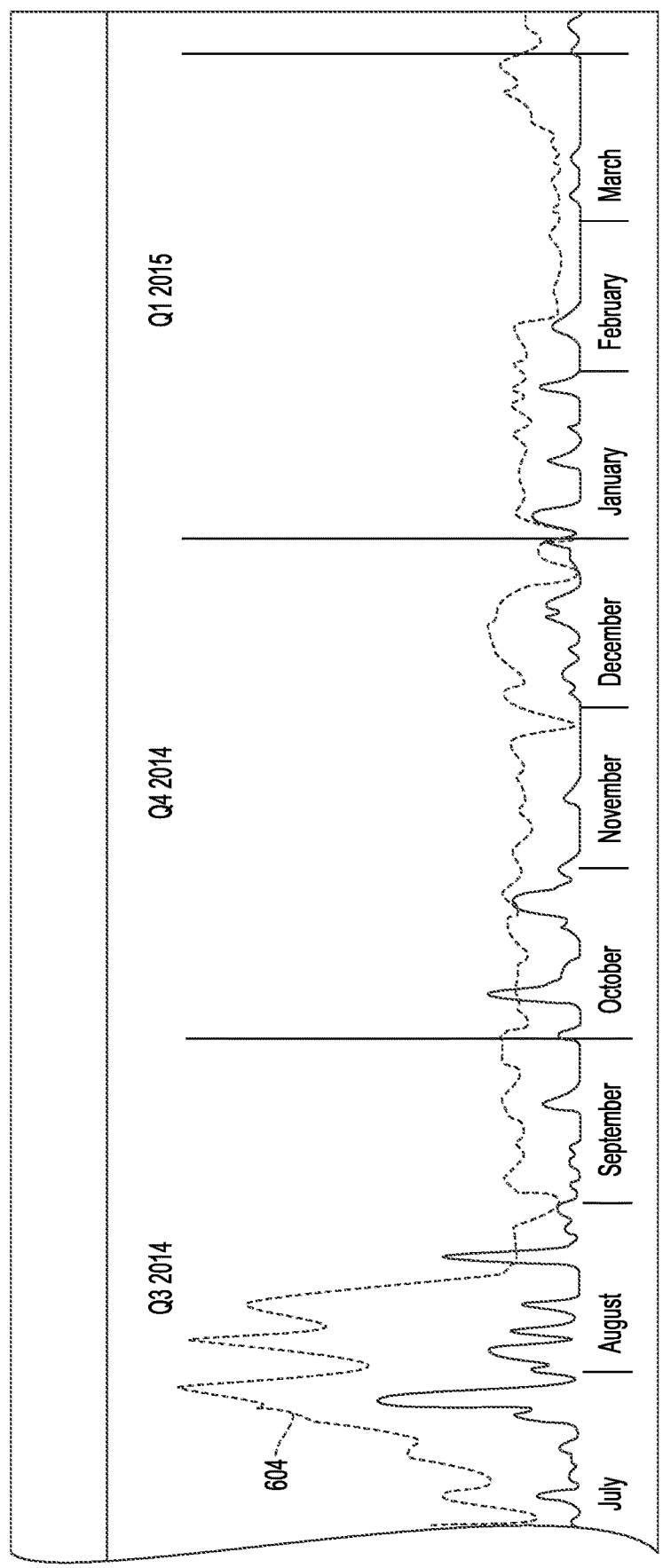

In some implementations, relationship analysis engine(s) 444 analyze electronic communication frequency and cyclical data to discover a particular broker's electronic communications frequency habits. The individual broker's habits, further, can be compared with other brokers (or the "average broker" based upon combined analytics) as one indication of the broker's effectiveness of using electronic communications. For example, the relationship analysis engine(s) 444 may analyze broker communications habits to derive correlations between electronic communications and business outcomes 448. In some embodiments, a communications habits and outcomes engine 454 generates reports and graphical analysis of an individual broker's communications patterns in light of peer behaviors and/or transactional outcomes. The communications habits and outcomes engine 454, for example, may generate a communication frequency visualization 600 of FIG. 6A. As illustrated in the frequency visualization 600, for example, one broker's electronic communication frequency 602 is revealed to be consistently below an average broker electronic communication frequency 604. Returning to FIG. 4C, in combining this analysis with transactional outcomes attributed to the broker, in some embodiments, the communication habits and outcomes engine(s) 454 can further investigate the strength of the particular broker's relationships. Additionally, the communication habits and outcomes engine(s) 454, in some embodiments, analyze a particular broker's electronic communications in relation to groups of correspondents (e.g., carriers vs. clients) to generate understanding in underlying relationship building patterns.

In some implementations, the relationship analysis engine(s) 444 obtain claims and exposure data 450 from the platform transactional data 424, and correlate the claims and exposure data 450 with the electronic communications 442 to obtain data linking electronics communications with receipt and resolution of insurance claims. The claims and exposure data 450, in some embodiments, is provided to an exposure engine(s) 456. The exposure engine(s) 456 may analyze the claims and exposure data 450, for example, to determine electronics communications patterns surrounding the receipt and resolution of insurance claims, and the impact on the bottom line (e.g., exposure) of carriers.

In order to present meaningful communication data from the dataset to a user, further processing and visualization may be performed. Business rules and logic can be applied to the business-related electronic communications message content 324 (FIG. 4A), the trade-related electronic communications message content (as described in relation to FIG. 4B), and/or the transaction data 410, 424. Further, the outputs of FIG. 4B and FIG. 4C, such as the placement marketing data 426, the insurance transaction compliance data 428, the transactional timings and patterns 430, the communications timing and patterns 446, the correlations between electronic communications and business outcomes 448, and/or the claims and exposure data 450 can be fed into reports or visualizations for end user review. Each of these sets of data may be incorporated into an analytics data store for future analysis. As additional data archives are recovered, the electronics message content may be cleaned, analyzed, and combined with historic message content and historic data as well as derived data (e.g., data sets generated in relation to FIGS. 4B and 4C) to analyze ongoing trends in electronic communications. Particular examples of analytics and visualizations follow.

Figure 5:
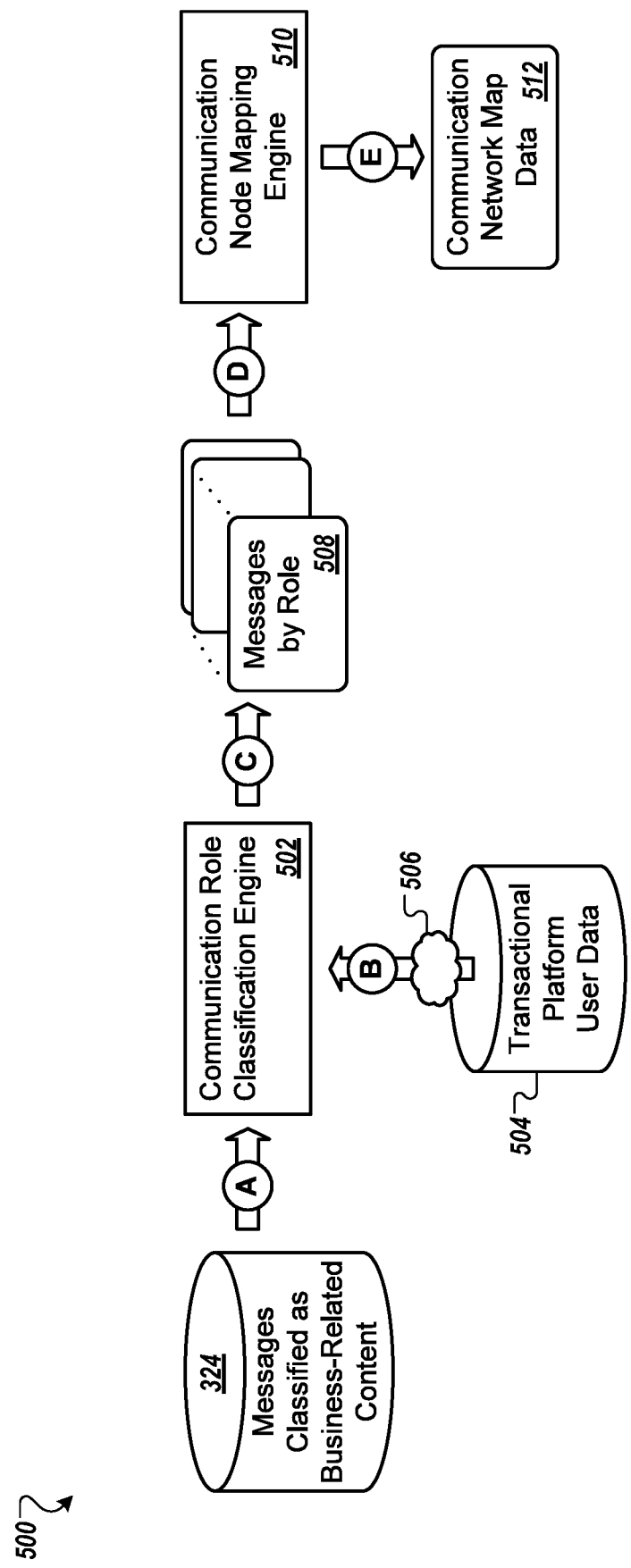
FIG. 5 is a block diagram of an example operational flow for classifying electronic communications messages by correspondent role and mapping communications relationships.

In some implementations, the sender and receiver data associated with each business-related electronic communication 324 may be matched to user roles within the transactional platform (e.g., brokers, carriers, clients, etc. in an insurance exchange platform) to classify the communications and later analyze the communications to glean valuable insights. Turning to FIG. 5, an operational flow 500 for matching messages with user roles, in some implementations, begins at step A with providing the business-related electronic communications 324 to a communication role classification engine 500 for matching the business-related electronic communications 324 with roles identified within transactional platform user data 504. The user data 504, for example, may be retrieved from the transactional platform via a network 506 at step B.

In some implementations, the communication role classification engine 502 matches each sender and each receiver in each of the messages classified as business-related content to roles, entities, and (if possible) user data within the transactional platform. The match may be direct (e.g., email address is known by the system). If a direct match is not possible, the domain of the email address (e.g., COMPANY.com) may be matched to an entity name (e.g., client, carrier, broker) within the transactional platform. A rule may be assumed by the entity (e.g., brokers work for the brokerage entity, insurance agents work for the carrier entity, etc.). In another example, the role may be left blank if the user is not matched within the insurance exchange platform. The communication role classification engine 502, at step C, outputs a mapping of messages classified by role and enhanced with user information 508.

Figure 6B:
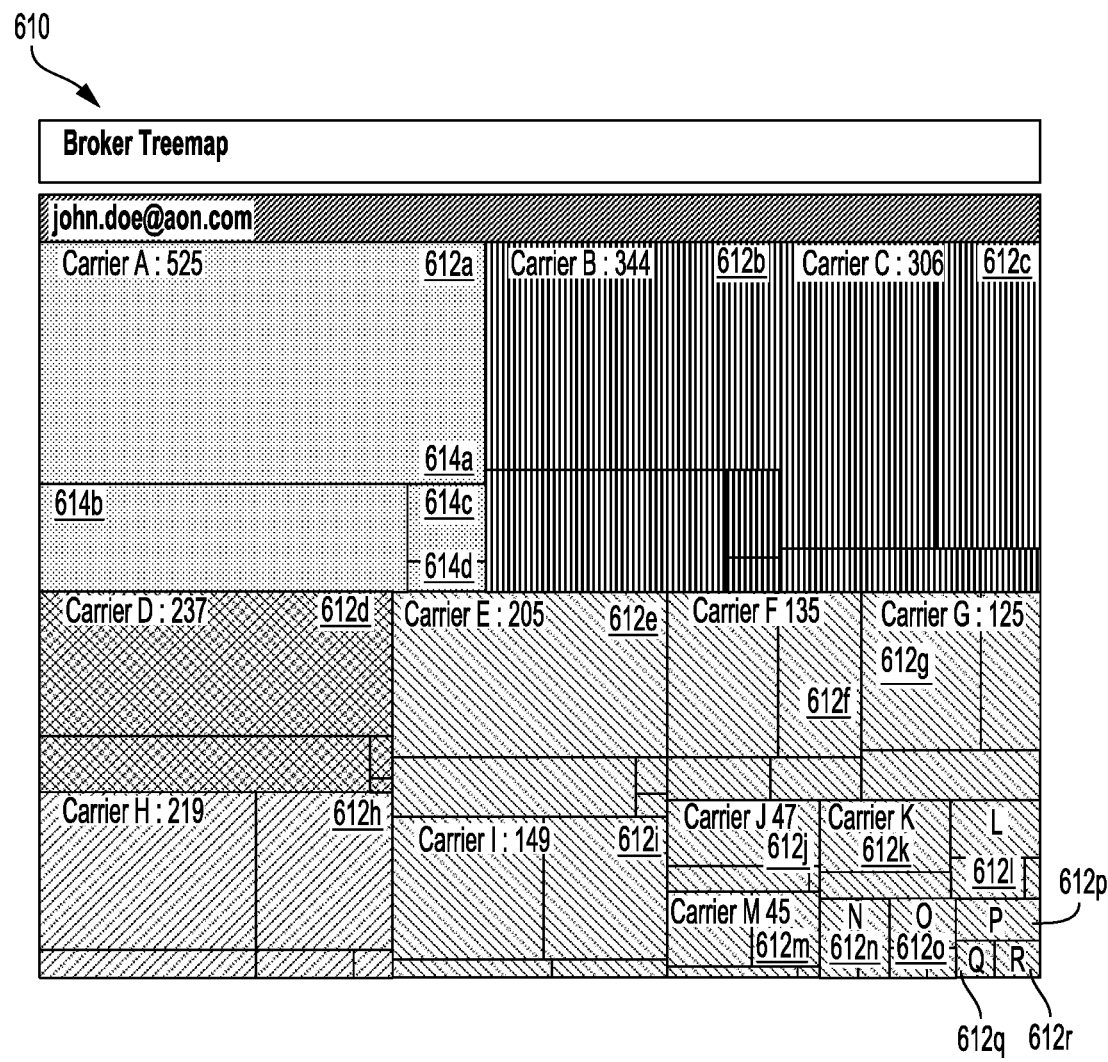

The role data, in an illustrative example shown in FIG. 6B, may be used to present a graphic display 610 to a particular broker demonstrating frequency of communications with each carrier 612 the broker has communicated with during the analyzed historic time period. As illustrated, for each carrier 612, a total number of messages per time period is listed, with relatively sized boxes stacked within the graph demonstrating those carriers receiving the most (and least) attention. The graphic display 610, for example, may quickly demonstrate strength of relationships between the broker and individual carriers 612 as well as, potentially, where the broker may reduce communications (e.g., the broker may be directing an undue amount of relationship building to a particular carrier 612).

In some implementations, each box, a number of sub-boxes, or divisions, are presented to illustrate different types of communications included within the full count. For example, as illustrated in relation to Carrier A, divisions 614a-614d may represent, in some examples, number of messages to carrier, number of messages from carrier, number of messages including multiple recipients, number of messages forwarded, and/or number of messages including one or more attachments. Further, the divisions 614a-614d may represent sources of electronic communications such as, in some examples, emails, text messages, in-application messaging system, and online form content. In some embodiments, upon selection of a particular carrier, the user may be able to drill down into a presentation analyzing the breakdown of the types of communications.

Returning to FIG. 5, at step D, the classified message data by role 508 is provided to a communication node mapping engine 510 to map numbers of discrete communications between communication partners. The communication node mapping engine 510, for example, may produce a reduced dataset of interconnected nodes (communications network map data 512) at step E. By organizing the electronic communications as interconnected nodes, one can quickly and easily determine, for example, whether any particular brokers have strong relationships with certain carriers or clients, whether any particular brokers have strong ties to certain industries (e.g., through user data classifying clients by industry), or whether any particular brokers have relationships that could be disengaged, passed off, or further pursued, for example.

In addition, by applying graph theory to connected nodes of the communication network may data 512, a number of valuable metrics can be calculated. A particularly insightful graph theory application to the communication node data is to measure and derive further metrics from "centrality scores". In some examples, the broker to carrier network distance (e.g., geographic reach of a broker's carrier network and vice-versa) and a broker to carrier ranking in comparison to all brokers (e.g., number and/or strength of carrier relationships) can be calculated based upon the communications node data. In a further example, broker to carrier sentiment scores can be derived through first identifying a broker's connections with various partners and then by analyzing electronic communications data for language or keywords used within the exchanges. In another example, broker to carrier neighbor nodes may be analyzed to identify previously non-obvious overlaps in participants.

A number of the above metrics may be combined into a customized equation to produce an overall indication of broker-to-carrier relationship health from the viewpoint of individual brokers. Additional example metrics that may be derived from node mapping are illustrated in a graphical display 700 of FIG. 7. Turning to FIG. 7, the analytics derived through communications node analytics may be combined with analytics derived from the transactional platform to generate a performance overview for a particular broker.

In some implementations, broker communications metrics may include, in some examples, broker node health 702 (e.g. balance of communications between the broker and clients as compared to communications between the broker and carriers) conversation count 704 (e.g., count of electronic messages as grouped into conversations between the broker and other particular parties), a connection score 706 (e.g., based upon a number of clients and carriers linked to this broker), and a flow percentile 708 (e.g., balance of outgoing correspondence vs. incoming correspondence, also referred to as node degree or valency). These metrics, for example, can identify opportunities for communications balancing and relationship building and expansion. Additionally, trend graphs related to broker node health 702, conversation count 704, and flow percentile 708 can illustrate improvements or setbacks from historic review periods.

Next, in some implementations, a shared carrier node with other broker represents number of additional brokers communicating with carriers that communicate with the present broker. In an illustrative example, in the circumstance where the present broker interacts with carriers A through F, if each of carriers B, D, and F interact with an additional broker within the system, the shared carrier node with other broker value would be three. In some embodiments, the additional broker represents other brokers within the same brokerage (e.g., how many team members are communicating with the same carrier). In other embodiments, the present broker represents the brokerage as a whole, and the additional brokers represent other brokerage entities.

In some implementations, the broker metrics include metrics involving tone or sentiment of electronic communications, for example through natural language processing or key word identification within body text of messages. As illustrated, the graphic display 700 includes an average email sentiment to carrier 712 (e.g., relative positivity of language in communications from the broker to the carrier), an average email sentiment from carrier 714 (e.g., relative positivity of language in communications from carriers to the broker), an email sentiment from carrier graphical display 716 (e.g., charting relative positive, neutral, and negative communications from the carriers to the broker), and an email sentiment from broker graphical display 718 (e.g., e.g., charting relative positive, neutral, and negative communications from the broker to the carriers).

Additionally, a carrier connection coverage 720 may demonstrate a percentage of carriers within the insurance exchange system communicatively linked to the broker.

Further, the graphical display 700, in some implementations, includes analytics derived from the transactional platform itself such as, in some examples, an annual bound opportunities 722, an annual total input trades 724, and an annual percentage renewals 726. As illustrate, the annual bound opportunities 722 and the annual total input trades 724 each include a corresponding bar graph demonstrating historic trends in the statistics for this trade creator.

Figure 6C:
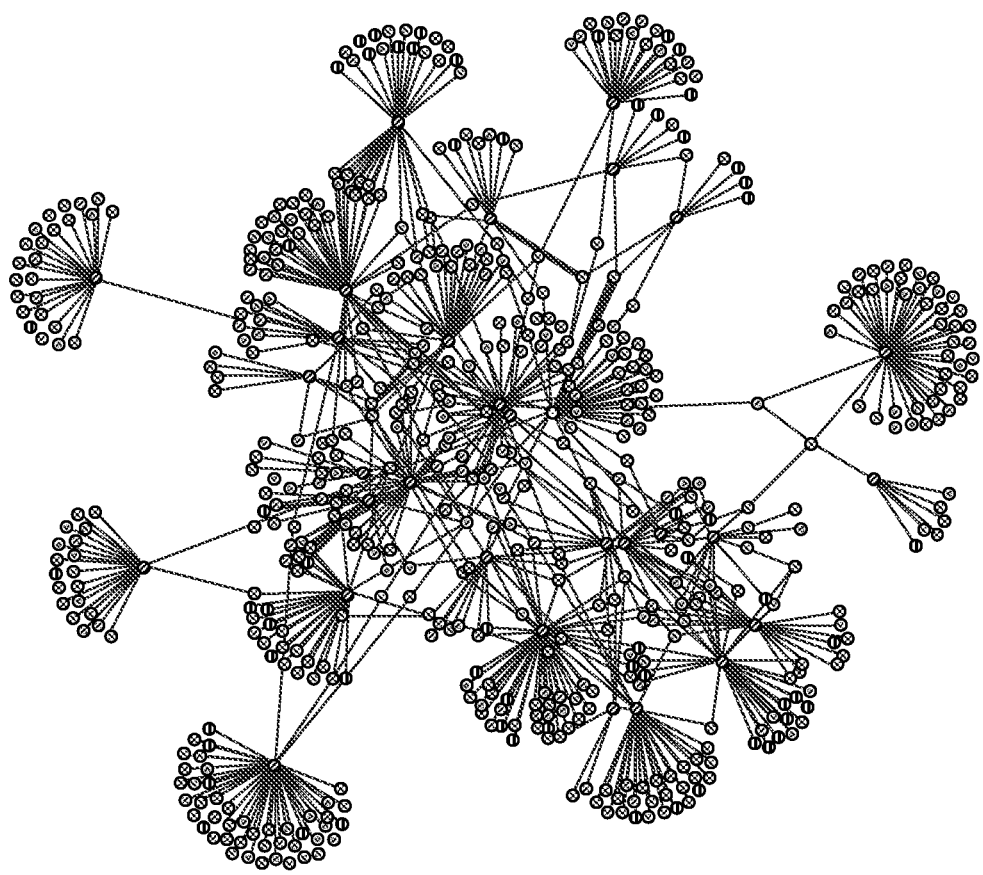
FIG. 6C is a screen shot of an example user interface illustrating cluster connections between members of an organization.

The communications network map data 512 of FIG. 5, in some embodiments, may be used to build network graphs for the broker electronic communication exchanges. Broker network graphs are useful in visualizing and identifying weak or strong relationships. For example, in a network graph visualization 620 shown in FIG. 6C, a breadth of a broker's network can be visualized by a cluster of connections linked to each broker 622 including a target broker 624. In the network graph visualization, nodes 626 represent internal platform participants (e.g., managers, administrators, and other non-broker users of the insurance exchange platform). The nodes 628 represent carriers. The lines connecting the various nodes may differ in width based on the number of electronic communications between each node. The visualization 650 may be generated, for example, by the communication patterns engine 452 of FIG. 4C through using the communication network map data 512 of FIG. 5.

Figure 6D:
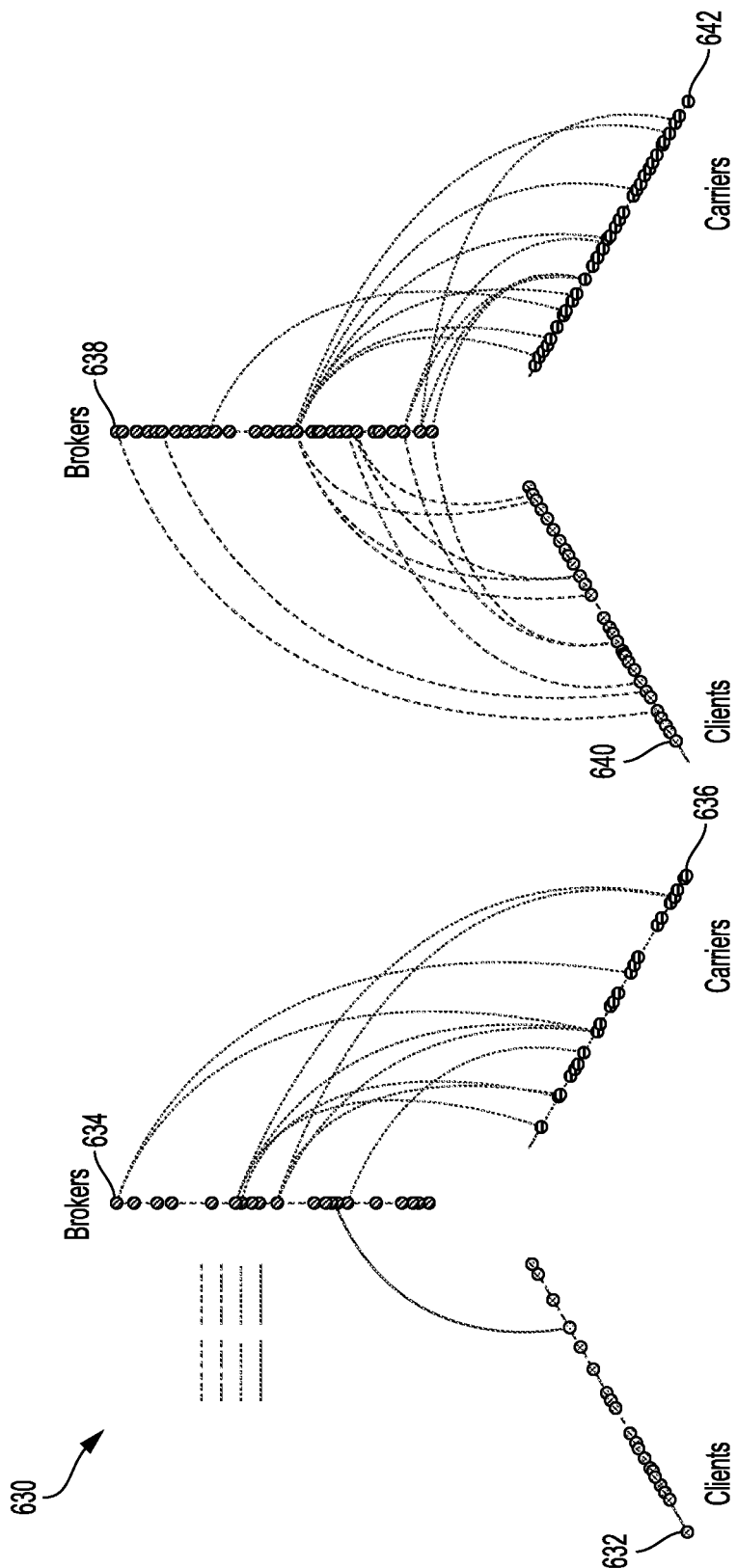
FIG. 6D is a screen shot of an example user interface illustrating comparison graphs demonstrating communication trends between two teams of individuals within an organization.

In another illustrative example, the communications network map data 512 of FIG. 5 can be analyzed to determine how well or how poorly teams of brokers communicate with their respective clients. High-frequency communications and low-frequency communications may be indicators of the business value that an individual broker brings, which may be addressed with further training on communication skills. For example, in a visualization 630 shown in FIG. 6D, an analysis of two different teams of brokers demonstrates that a first team 632 (left half of the figure) is unlikely to be communicating well with its clients 634, having the majority of the communications links distributed between the brokers 634 and carriers 636. Conversely, a second team 638 (right half of the figure) is likely to be communicating well with its clients 640 as well as with its carriers 642. The relationship between the brokers 634 and clients 632 in the first team may be identified as an at-risk relationship and a candidate for remediation. The visualization 650 may be generated, for example, by the communication patterns engine 452 of FIG. 4C through using the communication network map data 512 of FIG. 5.

Figure 6E:
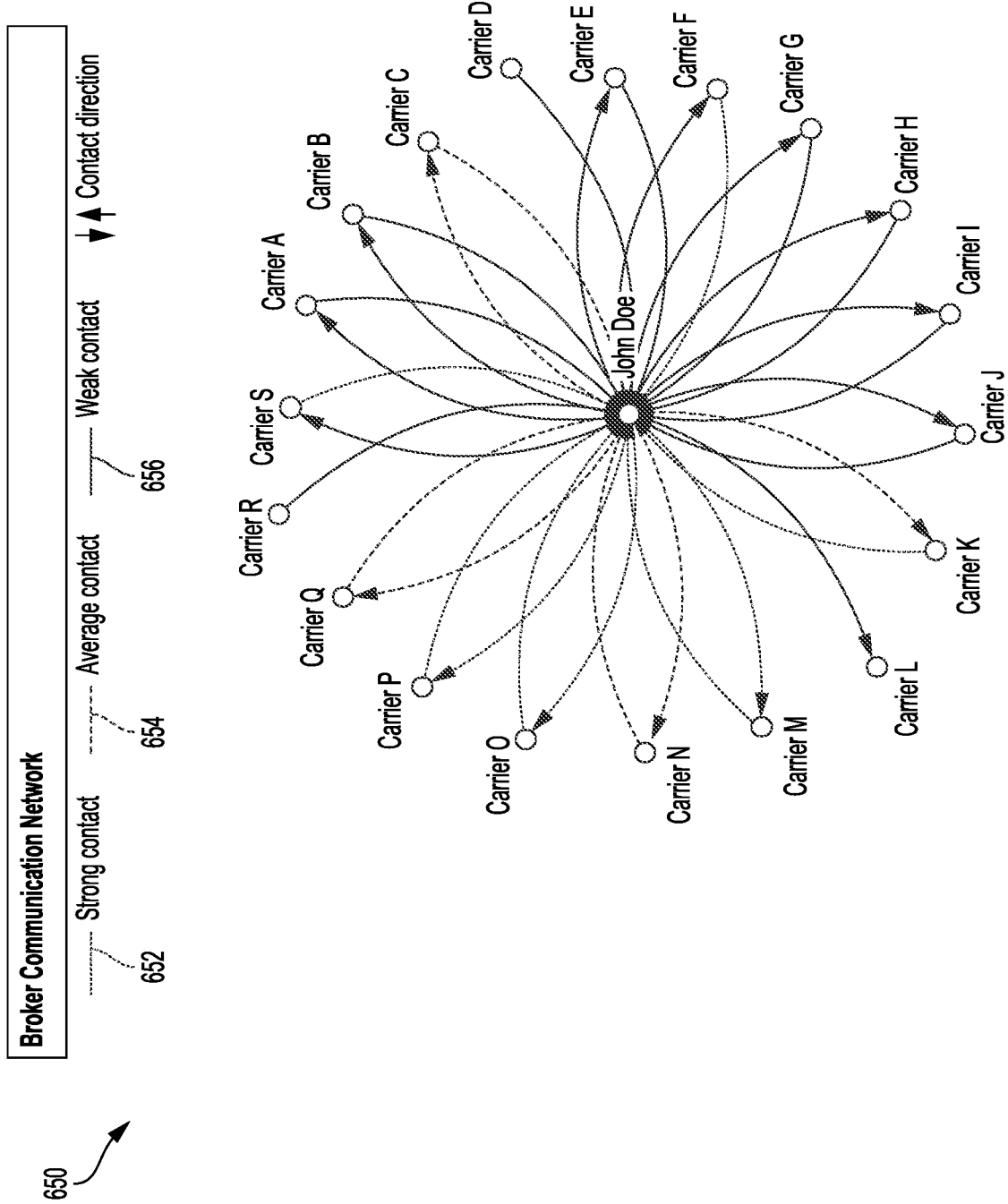
FIG. 6E is a screen shot of an example user interface illustrating strength and frequency of communications between an individual and a collection of respondents.

In some implementations, a front end for the visualization system may allow a user to query for particular insights. In one example, a user may submit a query for a broker name, obtaining a display of information about the queried broker name. Examples of such individual broker information may include visualizations of that broker's communications with individual carriers. For example, as shown in FIG. 6E, a visualization 650 demonstrates that color-coding may be used to show the strength of the communications and proportional sizing may be used to show the frequency of the communications. As illustrated in the visualization 650, communications between carriers and a broker are divided into strong contacts 652, average contacts 654, and weak contacts 656. In some examples, weak communications resulted in no contact-originated communication (e.g., between the broker and Carrier L). This may be due, in part, to the initial message filtering where only communications of a particular frequency were retained. For example, the broker may attempt contact a threshold number of times, with only one or a handful of responses from the recipient such that the responses are not captured in the graph. The visualization 650 may be generated, for example, by the communication patterns engine 452 of FIG. 4C through using the communication network map data 512 of FIG. 5.

In another example, the insurance transaction data of FIG. 4A may be linked to the role-based mapping of FIG. 5 for refined analysis of transactional relationships. In a particular illustration, a "sales funnel" visualization may be developed to illustrate the process by which a broker leads carrier(s) through the sales process. In this process, two datasets may be created: one representing how many trades of each status were managed by each broker, and another dataset showing the premiums managed by each broker. The status information, in some examples, can include pending, submitted, quoted, carrier declined, client rejected, and bound stages. This information can be used to show a correlation between broker communications and premiums and bindings.

Figure 8:
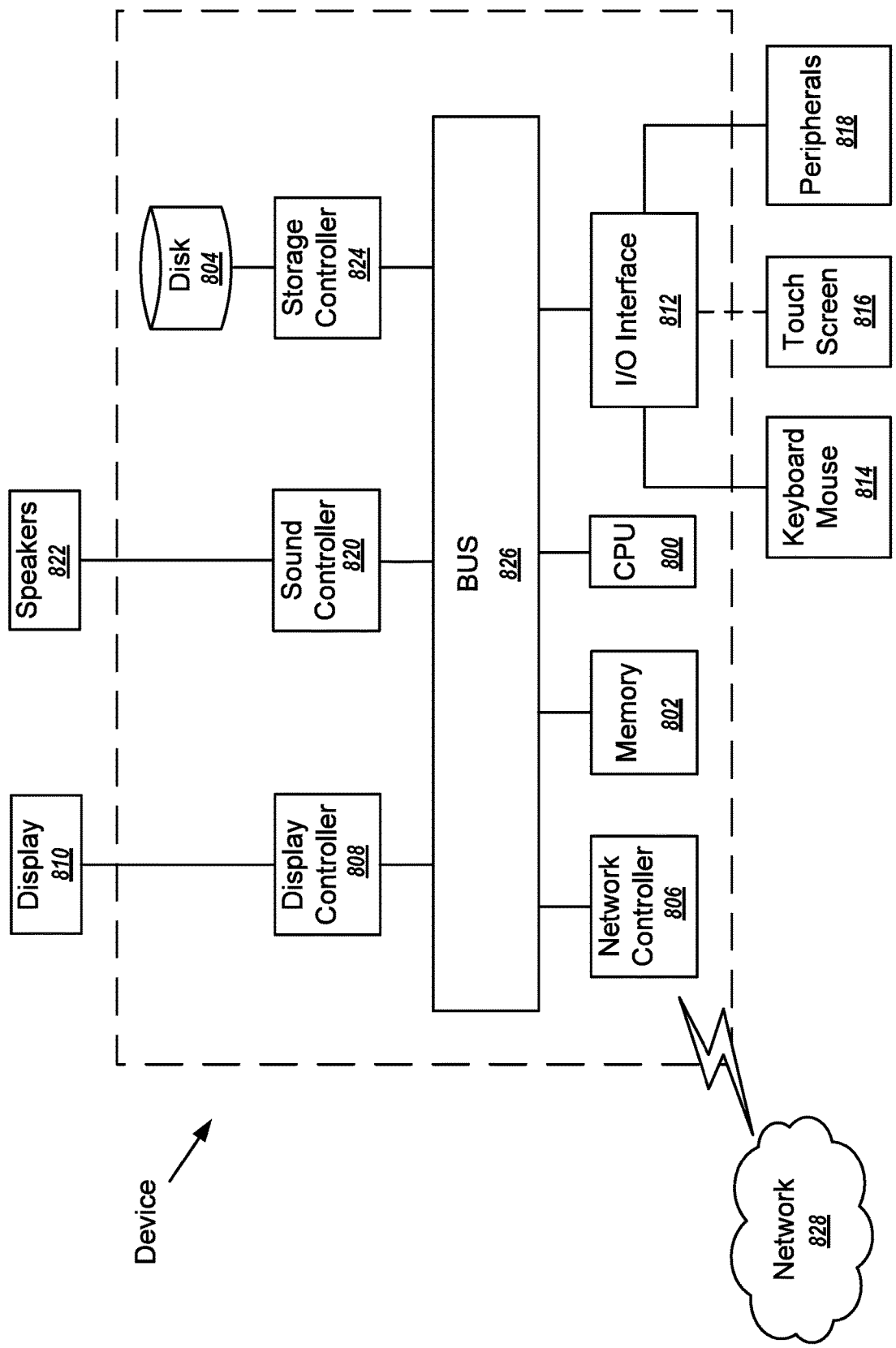
FIG. 8 is a block diagram of an example computing system.

Next, a hardware description of the computing device, mobile computing device, or server according to exemplary embodiments is described with reference to FIG. 8. The computing device of FIG. 8, for example, may be used to execute one or more of the decompression and data extraction engine 108 and the message formatting engine 112 of FIG. 1A, the message content filtering engine 118 of FIG. 1B, the message fingerprinting engine 142 and the fingerprint analysis engine 148 of FIG. 1C, the message content filtering engine 118 of FIG. 1D, the ground truth identification engine 302 and the ground truth analysis engine 310 of FIG. 3A, the message content classification engine 322 of FIG. 3B, the trade information parsing engine 402 and the trade matching engine 408 of FIG. 4A, the transactional analysis engine(s) 422, the report generating engine 432, the relationship analysis engine(s) 434, and the timings engine(s) 436 of FIG. 4B, the relationship analysis engine(s) 444, the communication patterns engine(s) 452, the communication habits and outcomes engine(s) 454, and the exposure engine(s) 456 of FIG. 4C, and the communication role classification engine 502 and communication node mapping engine 510 of FIG. 5. The method 200 of FIG. 2, for example, could be performed on processing circuitry of the computing device of FIG. 8. In FIG. 8, the computing device, mobile computing device, or server includes a CPU 800 which performs the processes described above. The process data and instructions may be stored in memory 802.

These processes and instructions may also be stored on a storage medium disk 804 such as a hard drive (HDD) or portable storage medium or may be stored remotely. In some examples, the memory 802 and/or storage medium disk 804 may store the compressed data set 106, the messages 114, and/or the attachments 116 of FIG. 1A, the user roles 120 and/or filtered formatted messages 132 of FIG. 1B, the communications fingerprints 146, user accounts 144, and/or weak relationships 152 of FIG. 1C, the electronic communications archive 152 of FIG. 1D, the machine learning model 312 of FIG. 3A, the business-related electronic messages 324 of FIG. 3B, the machine learning model 404, trade data 406, transaction platform trade data 410, and/or insurance transaction data 414 of FIG. 4A, the transaction platform transactional data 412, the placement marketing data 426, the transaction compliance data 428, and/or the transactional timings and patterns 430 of FIG. 4B, the business-related not trade-related electronic communications 442, the communications timings and patterns data 446, the correlations between electronic communications and business outcomes 448, and/or the claims exposure data 450 of FIG. 4C, and/or the transactional platform user data 504, the messages by role mappings 508, and/or the communication network map data 512 of FIG. 5. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device, mobile computing device, or server communicates, such as a server or computer.

Further, a portion of the claimed advancements may be provided as a utility application, background daemon, or component of an operating system, or combination thereof, executing in conjunction with CPU 800 and an operating system such as Microsoft Windows 8, UNIX, Solaris, LINUX, Apple MAC-OS and other systems known to those skilled in the art.

CPU 800 may be a Xenon or Core processor from Intel of America or an Opteron processor from AMD of America, or may be other processor types that would be recognized by one of ordinary skill in the art. Alternatively, the CPU 800 may be implemented on an FPGA, ASIC, PLD or using discrete logic circuits, as one of ordinary skill in the art would recognize. Further, CPU 800 may be implemented as multiple processors cooperatively working in parallel to perform the instructions of the inventive processes described above. For example, the CPU 800 may provide the processing circuitry to perform the operations of the decompression and data extraction engine 108 and the message formatting engine 112 of FIG. 1A, the message content filtering engine 118 of FIG. 1B, the message fingerprinting engine 142 and the fingerprint analysis engine 148 of FIG. 1C, the message content filtering engine 118 of FIG. 1D, the ground truth identification engine 302 and the ground truth analysis engine 310 of FIG. 3A, the message content classification engine 322 of FIG. 3B, the trade information parsing engine 402 and the trade matching engine 408 of FIG. 4A, the transactional analysis engine(s) 422, the report generating engine 432, the relationship analysis engine(s) 434, and the timings engine(s) 436 of FIG. 4B, the relationship analysis engine(s) 444, the communication patterns engine(s) 452, the communication habits and outcomes engine(s) 454, and the exposure engine(s) 456 of FIG. 4C, and the communication role classification engine 502 and communication node mapping engine 510 of FIG. 5. The method 200 of FIG. 2, for example, could be performed on processing circuitry such as the CPU 800.

The computing device, mobile computing device, or server in FIG. 8 also includes a network controller 806, such as an Intel Ethernet PRO network interface card from Intel Corporation of America, for interfacing with network 828. As can be appreciated, the network 828 can be a public network, such as the Internet, or a private network such as an LAN or WAN network, or any combination thereof and can also include PSTN or ISDN sub-networks. The network 828 can also be wired, such as an Ethernet network, or can be wireless such as a cellular network including EDGE, 3G and 4G wireless cellular systems. The wireless network can also be Wi-Fi, Bluetooth, or any other wireless form of communication that is known. In some examples, the network 828 may represent the network 104 of FIG. 1A, the network 412 of FIG. 4A, and/or the network 506 of FIG. 5.

The computing device, mobile computing device, or server further includes a display controller 808, such as a NVIDIA GeForce GTX or Quadro graphics adaptor from NVIDIA Corporation of America for interfacing with display 810, such as a Hewlett Packard HPL2445w LCD monitor. A general purpose I/O interface 812 interfaces with a keyboard and/or mouse 814 as well as a touch screen panel 816 on or separate from display 810. General purpose I/O interface also connects to a variety of peripherals 818 including printers and scanners, such as an OfficeJet or DeskJet from Hewlett Packard. The display controller 808 and/or display 810 may be used to present, in some examples, the visualization 600 of FIG. 6A, the visualization 610 of FIG. 6B, the visualization 620 of FIG. 6C, the visualization 630 of FIG. 6D, the visualization 650 of FIG. 6E, and/or the visualization 700 of FIG. 7.

A sound controller 820 is also provided in the computing device, mobile computing device, or server, such as Sound Blaster X-Fi Titanium from Creative, to interface with speakers/microphone 822 thereby providing sounds and/or music.

The general purpose storage controller 824 connects the storage medium disk 804 with communication bus 826, which may be an ISA, EISA, VESA, PCI, or similar, for interconnecting all of the components of the computing device, mobile computing device, or server. A description of the general features and functionality of the display 810, keyboard and/or mouse 814, as well as the display controller 808, storage controller 824, network controller 806, sound controller 820, and general purpose I/O interface 812 is omitted herein for brevity as these features are known.

One or more processors can be utilized to implement various functions and/or algorithms described herein, unless explicitly stated otherwise. Additionally, any functions and/or algorithms described herein, unless explicitly stated otherwise, can be performed upon one or more virtual processors, for example on one or more physical computing systems such as a computer farm or a cloud drive.

Reference has been made to flowchart illustrations and block diagrams of methods, systems and computer program products according to implementations of this disclosure. Aspects thereof are implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 9:
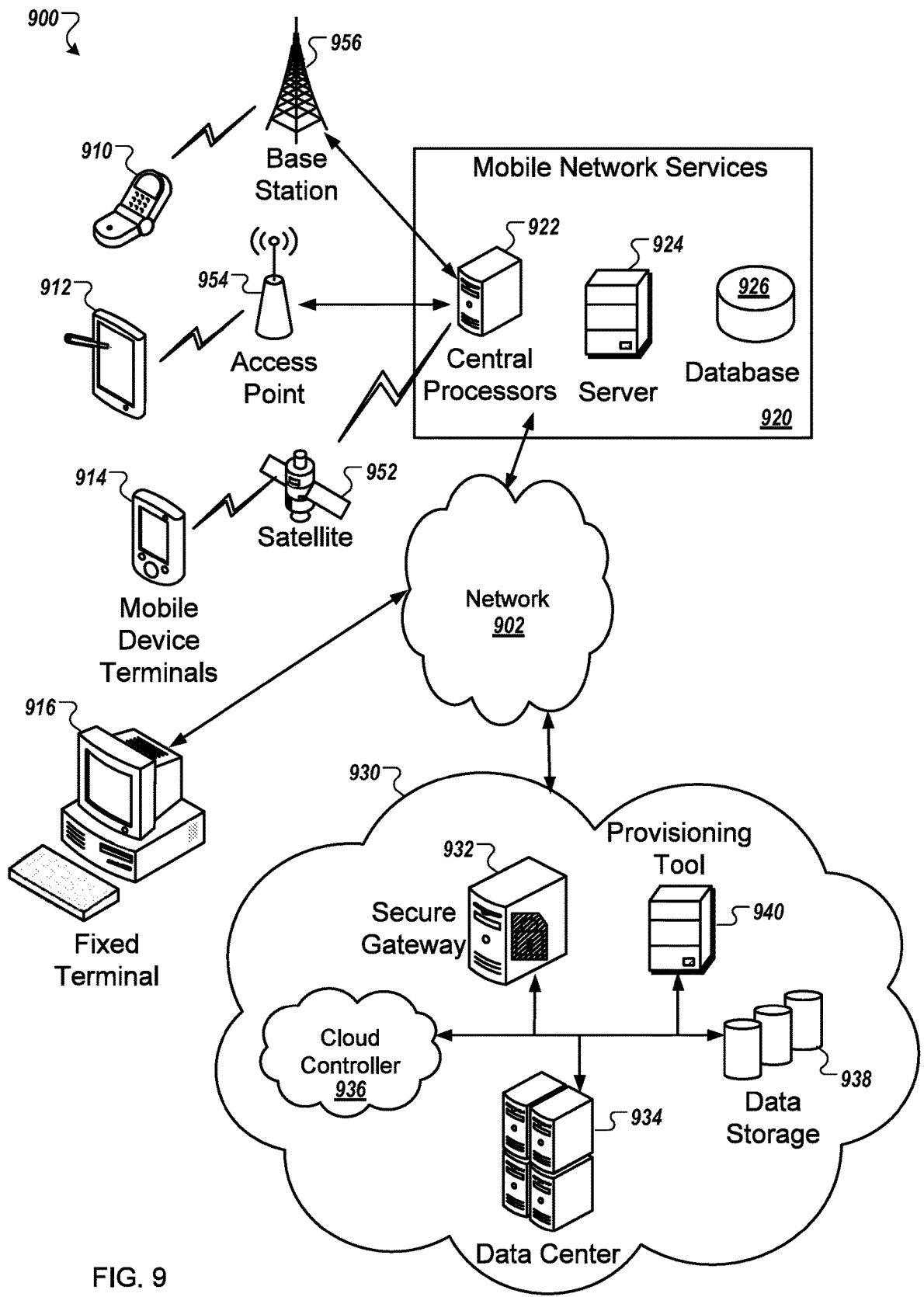
FIG. 9 is a block diagram of an example distributing computing environment including a cloud computing environment.

The functions and features described herein may also be executed by various distributed components of a system. For example, one or more processors may execute these system functions, wherein the processors are distributed across multiple components communicating in a network. The distributed components may include one or more client and server machines, which may share processing, as shown on FIG. 9, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

In some implementations, the described herein may interface with a cloud computing environment 930, such as Google Cloud Platform™ to perform at least portions of methods or algorithms detailed above. The cloud computing environment 930, in some examples, can be used to execute one or more of the decompression and data extraction engine 108 and the message formatting engine 112 of FIG. 1A, the message content filtering engine 118 of FIG. 1B, the message fingerprinting engine 142 and the fingerprint analysis engine 148 of FIG. 1C, the message content filtering engine 118 of FIG. 1D, the ground truth identification engine 302 and the ground truth analysis engine 310 of FIG. 3A, the message content classification engine 322 of FIG. 3B, the trade information parsing engine 402 and the trade matching engine 408 of FIG. 4A, the transactional analysis engine(s) 422, the report generating engine 432, the relationship analysis engine(s) 434, and the timings engine(s) 436 of FIG. 4B, the relationship analysis engine(s) 444, the communication patterns engine(s) 452, the communication habits and outcomes engine(s) 454, and the exposure engine(s) 456 of FIG. 4C, and the communication role classification engine 502 and communication node mapping engine 510 of FIG. 5. The method 200 of FIG. 2, for example, could be performed in the cloud computing environment 930. The processes associated with the methods described herein can be executed on a computation processor, such as the Google Compute Engine by data center 934. The data center 934, for example, can also include an application processor, such as the Google App Engine, that can be used as the interface with the systems described herein to receive data and output corresponding information. The cloud computing environment 930 may also include one or more databases 938 or other data storage, such as cloud storage and a query database. In some examples, one or more of the messages 114 and the attachments 116 of FIG. 1A, the filtered formatted messages 132 of FIG. 1B, the user roles 120, the user accounts 144 and weak relationships 152 of FIG. 1C, the electronic communications archive 152 of FIG. 1D, the ground truth 308 of FIG. 3A, the messages classified as business-related content 324 of FIG. 3B, the transaction platform trade data 410 and the insurance transaction data 414 of FIG. 4A, the transaction platform transactional data 424 of FIG. 4B, the business-related not trade-related electronic communications 442 of FIG. 4C, and the transactional platform user data 504 and the messages by role 508 of FIG. 5 may be stored in one or more databases 938 or other data storage. In some implementations, the cloud storage database 938, such as the Google Cloud Storage, may store processed and unprocessed data supplied by systems described herein.

The systems described herein may communicate with the cloud computing environment 930 through a secure gateway 932. In some implementations, the secure gateway 932 includes a database querying interface, such as the Google BigQuery platform. The query platform, for example, may be used by the operational flow 400 to query the transaction platform trade data 410, by the operational flow 420 to query the transaction platform transactional data 424 of FIG. 4B, the operational flow 440 of FIG. 4C to query the transaction platform transactional data 424, or the operational flow 500 of FIG. 5 to query the transactional platform user data 504.

The cloud computing environment 102 may include a provisioning tool 940 for resource management. The provisioning tool 940 may be connected to the computing devices of a data center 934 to facilitate the provision of computing resources of the data center 934. The provisioning tool 940 may receive a request for a computing resource via the secure gateway 932 or a cloud controller 936. The provisioning tool 940 may facilitate a connection to a particular computing device of the data center 934.

A network 902 represents one or more networks, such as the Internet, connecting the cloud environment 930 to a number of client devices such as, in some examples, a cellular telephone 910, a tablet computer 912, a mobile computing device 914, and a desktop computing device 916. The network 902 can also communicate via wireless networks using a variety of mobile network services 920 such as Wi-Fi, Bluetooth, cellular networks including EDGE, 3G and 4G wireless cellular systems, or any other wireless form of communication that is known. In some embodiments, the network 902 is agnostic to local interfaces and networks associated with the client devices to allow for integration of the local interfaces and networks configured to perform the processes described herein.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "about," "proximate," "minor variation," and similar terms generally refer to ranges that include the identified value within a margin of 20%, 10% or preferably 5% in certain embodiments, and any values therebetween.

All of the functionalities described in connection with one embodiment are intended to be applicable to the additional embodiments described below except where expressly stated or where the feature or function is incompatible with the additional embodiments. For example, where a given feature or function is expressly described in connection with one embodiment but not expressly mentioned in connection with an alternative embodiment, it should be understood that the inventors intend that that feature or function may be deployed, utilized or implemented in connection with the alternative embodiment unless the feature or function is incompatible with the alternative embodiment.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. A method for using historic electronic communications in enhancing transactional metrics related to a transactional platform, the method comprising:
  accessing a time period of historic electronic communications data for an organization, the historic electronic communications data comprising a plurality of messages;
  filtering, by processing circuitry, the plurality of messages to remove a subset of irrelevant messages, wherein the filtering produces a subset of relevant messages;
  fingerprinting, by the processing circuitry, each message of the subset of relevant messages to track communications between each sender-recipient(s) group of a plurality of sender-recipient(s) groups over time, wherein fingerprinting comprises
    producing unique identifiers for each sender-recipient(s) group,
    aggregating occurrences of contact per time period of a plurality of time periods,
    identifying a plurality of sender-recipient(s) groups demonstrating weak relationship behavior based upon the aggregated occurrences of contact,
    removing, from the subset of relevant messages, one or more messages having one of the plurality of sender-recipient(s) groups demonstrating weak relationship behavior, and
    storing the aggregated occurrences in a communications data structure;
after filtering, analyzing, by the processing circuitry, body text of a plurality messages in the subset of relevant messages to identify a subset of business-related messages containing business-related content;
matching, by the processing circuitry, contents of a plurality of the subset of business-related messages to transaction data, wherein matching comprises
    applying a machine learning model to classify each of the subset of business-related messages as being trade related or not trade related, wherein the trade related messages of the subset of business-related messages contain content associated with trading transactions,
    for each of the subset of business-related messages identified as being trade related, parsing at least body text to identify trade data, wherein the trade data comprises trade-related terminology, and
    querying a transaction data store using the trade data to identify one or more matching transaction records to a portion of the subset of business-related messages identified as being trade related; and
merging a portion of the trade data with matched transaction data obtained from the transaction data store to generate a plurality of enhanced transactional data records.

2. The method of claim 1, further comprising generating, by the processing circuitry using the fingerprinting, communication network map data representing communications patterns between each sender-recipient(s) group.

3. The method of claim 1, further comprising:
determining, by processing circuitry for each message of a plurality of messages, role data relevant to a sender or one or more recipients, wherein the role data corresponds to roles within the organization; and
filtering, by the processing circuitry, the plurality of messages by one or more roles relevant to desired data analytics.

4. The method of claim 3, wherein filtering comprises removing messages having the sender or a first recipient of the one or more recipients identified as support personnel based on role data.

5. The method of claim 1, wherein analyzing the body text comprises applying a second machine learning model designed to identify business-related messages based on the business-related content.

6. The method of claim 1, further comprising analyzing the enhanced transactional data records to confirm audit trail information accessed from the transaction data store.

7. The method of claim 1, wherein identifying trade data further comprises parsing text of an attachment to one or more of the subset of business-related messages identified as being trade related.

8. A system comprising one or more processors, wherein the system includes a plurality of subsystems, each subsystem configured to execute on a portion of the one or more processors, the plurality of subsystems using historic electronic communications in enhancing metrics related to client relationships, wherein the plurality of subsystems include:
a data extraction subsystem that
    accesses a time period of historic electronic communications data for an organization, the historic electronic communications data comprising a plurality of messages, and
    organizes the plurality of messages in a standardized format;
a message content filtering engine that filters the plurality of messages to remove a subset of irrelevant messages, wherein the filtering produces a subset of relevant messages;
a message fingerprinting subsystem that
    produces unique identifiers for each sender-recipient(s) group within the subset of relevant messages,
    aggregates occurrences of contact per time period of a plurality of time periods,
    identifies a plurality of sender-recipient(s) groups demonstrating weak relationship behavior based upon the aggregated occurrences of contact,
    removes messages having one of the plurality of sender-recipient(s) groups demonstrating weak relationship behavior, and
    stores the aggregated occurrences in a communications data structure; and
a relationship analysis subsystem that
analyzes aggregated occurrences within each sender-recipient(s) group over the plurality of time periods,
determines communications patterns over the plurality of time periods,
accesses transactional data over the plurality of time periods, and
correlates business outcomes derived from the transactional data with the communications patterns.

9. The system of claim 8, wherein the relationship analysis subsystem is further configured to analyze body text of each message of a plurality of messages in the subset of relevant messages to identify a sentiment of the message, wherein the sentiment comprises one of positive, negative, and neutral.

10. The system of claim 8, further comprising a transactional analysis subsystem that:
accesses claims data from a transactional platform; and
correlates claims handling with aggregated occurrences of contact between the relevant parties during a timeframe of the claims handling.

11. The system of claim 8, further comprising a transactional analysis subsystem that:
accesses placement data for a plurality of transactions each involving placing a client of a plurality of clients with a product of a plurality of products; and
correlates the placement data with the plurality of messages to identify communications relevant to a plurality of unsuccessful quotes and a plurality of successful quotes;
wherein the relationship analysis subsystem analyzes communications patterns for a timeframe of each of the plurality of transactions.

12. The system of claim 8, further comprising a report generating subsystem that generates a graphical user interface presenting metrics associated with the correlated business outcomes.

13. A non-transitory computer readable medium having instructions stored thereon, wherein the instructions, when executed by processing circuitry, cause the processing circuitry to:
- access a time period of historic electronic communications data for an organization, the historic electronic communications data comprising a plurality of messages, each message comprising a sender, one or more recipients, and body text;
- filter the plurality of messages to remove a subset of irrelevant messages, wherein the filtering produces a subset of relevant messages;
- fingerprint each message of the subset of relevant messages to track communications between each sender-recipient(s) group of a plurality of sender-recipient(s) groups over time, wherein fingerprinting comprises
  - producing unique identifiers for each sender-recipient(s) group,
  - aggregating occurrences of contact per time period of a plurality of time periods,
  - identifying a plurality of sender-recipient(s) groups demonstrating weak relationship behavior based upon the aggregated occurrences of contact,
  - removing, from the subset of relevant messages, one or more messages having one of the plurality of sender-recipient(s) groups demonstrating weak relationship behavior, and
  - storing the aggregated occurrences in a communications data structure;
- after filtering, analyze body text of a plurality of messages in the subset of relevant messages to identify a subset of business-related messages containing business-related content;
- query a data store of a transactional platform for user data regarding a plurality of users;
- for each message of the plurality of messages in the subset of relevant messages,
  - cross-reference the sender and each of the one or more recipients with the plurality of users of the transactional platform, and
  - upon identifying a match, link platform role information with the respective electronic message identifying a role of the matching sender or recipient within the transactional platform; and
- generate communication network map data representing a mapping of communications relationships between users of the transactional platform, wherein generating the communication network map data comprises organizing the plurality of messages in the subset of relevant messages as interconnected nodes.

14. The non-transitory computer readable medium of claim 13, wherein the instructions, when executed by the processing circuitry, cause the processing circuitry to apply graph theory to the communication network map data to determine a plurality of centrality scores representing strengths of relationships among users of the transactional platform.

15. The non-transitory computer readable medium of claim 13, wherein the instructions, when executed by the processing circuitry, cause the processing circuitry to:
- generate a graphical representation of the communication network map data; and
- present the graphical representation to a user of a remote computing device, wherein
  - the graphical representation comprises a graphical comparison of communication strength of members of a team, including graphical representations of historic communications between each member of a team and each client of the team over a timeframe.

16. The non-transitory computer readable medium of claim 13, wherein the roles within the transactional platform comprise a provider role, a broker role, and a client role.

17. The non-transitory computer readable medium of claim 13, wherein a portion of the plurality of messages comprise messages composed using an intra-application messaging tool of the transactional platform.

18. The non-transitory computer readable medium of claim 13, further comprising formatting the plurality of messages into a file format allowing for programmatic access of portions of the plurality of messages, wherein the portions include the body text, the sender, and the one or more recipients.

* * * * *